US008225901B2

(12) United States Patent
Ohtsuki et al.

(10) Patent No.: US 8,225,901 B2
(45) Date of Patent: Jul. 24, 2012

(54) FRAME STRUCTURE OF A VEHICLE

(75) Inventors: Kazuhiko Ohtsuki, Hyogo (JP);
Toshiyuki Hasegawa, Hyogo (JP);
Atsuo Yoshina, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 1071 days.

(21) Appl. No.: 12/141,756

(22) Filed: Jun. 18, 2008

(65) Prior Publication Data

US 2008/0251336 A1 Oct. 16, 2008

Related U.S. Application Data

(62) Division of application No. 10/731,247, filed on Dec. 10, 2003, now Pat. No. 7,398,853.

(30) Foreign Application Priority Data

Dec. 24, 2002 (JP) .................................. 2002-372636
Dec. 24, 2002 (JP) .................................. 2002-372681
Dec. 24, 2002 (JP) .................................. 2002-372717

(51) Int. Cl.
*B60K 17/00* (2006.01)
*B60K 17/28* (2006.01)
*B62D 21/00* (2006.01)

(52) U.S. Cl. ...... 180/312; 180/53.1; 180/53.4; 180/292; 180/305

(58) Field of Classification Search .................. 180/312, 180/311, 292, 291, 377, 378, 305, 307, 344, 180/374, 376, 339, 53.1, 53.4; 74/606 R, 74/607, 745, 335

See application file for complete search history.

(56) References Cited

U.S. PATENT DOCUMENTS 2,178,331 A 10/1939 Armstrong
3,712,404 A 1/1973 Walquist
(Continued)

FOREIGN PATENT DOCUMENTS

DE 19519227 12/1995
(Continued)

OTHER PUBLICATIONS

European Search Report for EP Patent Application No. 03027752.9, pp. 2-5., mailed Apr. 6, 2004.

(Continued)

*Primary Examiner* — Paul N Dickson
*Assistant Examiner* — George Spisich
(74) *Attorney, Agent, or Firm* — Sterne, Kessler, Goldstein & Fox PLLC

(57) ABSTRACT

In a frame structure of a vehicle that includes a flywheel housing, an intermediate housing and a transmission case that are connected to each other along a longitudinal axis of the vehicle to constitute a vehicle frame, the intermediate housing has a hollow shape with a first end and a second end located along the longitudinal axis of the vehicle, the first end having an abutting surface against which the second end of the flywheel housing abuts, a support surface located radially inwardly of the abutting surface so as to support the forward/rearward movement switching unit, and an opening surrounded by the support surface, the opening serving as a first-end opening of the intermediate housing along the longitudinal axis of the vehicle. The abutting surface and the support surface along the longitudinal axis of the vehicle are located so that at least a portion of the forward/rearward movement switching unit is accommodated within the flywheel housing.

2 Claims, 24 Drawing Sheets

U.S. PATENT DOCUMENTS

| | | | |
|---|---|---|---|
| 4,628,768 A | 12/1986 | Omura et al. | |
| 4,716,775 A | 1/1988 | Horii et al. | |
| 4,741,227 A | 5/1988 | Yamada et al. | |
| 5,058,455 A * | 10/1991 | Nemoto et al. | 74/606 R |
| 5,544,547 A * | 8/1996 | Ishimaru | 74/730.1 |
| 5,690,001 A | 11/1997 | Matsufuji | |
| 6,419,041 B1 | 7/2002 | Nemoto | |
| 2002/0007698 A1 | 1/2002 | Matsufuji | |
| 2002/0026853 A1 | 3/2002 | Matsufuji et al. | |
| 2003/0136602 A1 | 7/2003 | Tsuda | |

FOREIGN PATENT DOCUMENTS

| | | |
|---|---|---|
| JP | 55-86150 | 12/1953 |
| JP | 1-156160 | 6/1989 |
| JP | 1-165335 | 11/1989 |
| JP | 3-30628 | 3/1991 |
| JP | 04-005125 | 1/1992 |
| JP | 4-171346 | 6/1992 |
| JP | 8-2267 | 1/1996 |
| JP | 08-132898 * | 5/1996 |
| JP | 2000-289478 | 10/2000 |
| JP | 2001-227563 | 8/2001 |
| JP | 2002-301940 | 10/2002 |

OTHER PUBLICATIONS

Japanese Office Action for JP 2002-372636, along with English translation, 8 pgs., mailed Jun. 8, 2007.

Japanese Office Action for JP 2002-372717, along with English translation, 7 pgs., mailed Feb. 8, 2008.

* cited by examiner

FRAME STRUCTURE OF A VEHICLE

CROSS REFERENCE TO RELATED APPLICATION

This application claims priorities from Japanese Patent Application Nos. 2002-372636, 2002-372681 and 2002-372717, which are incorporated herein by reference.

BACKGROUND OF THE INVENTION

1. Field of the Invention

The present invention relates to a vehicle that is equipped with a transmission mechanism.

2. Related Art

A known frame structure as disclosed such as in Japanese Patent Application Laid-open No. Hei-08-2267 is formed by connection members made up of a flywheel housing, an intermediate housing and/or a transmission case that are connected to each other along a longitudinal axis of the vehicle (hereinafter simply referred to a vehicle longitudinal axis). The frame structure of this type has an inner space, a part or all of which is utilized as a hydraulic fluid reservoir tank.

The frame structure of the above type has an insufficient capability in a point as discussed below.

First of all, the frame structure of the above-cited reference includes a front housing (flywheel housing) that accommodates a flywheel and a sub-speed change unit, a transmission case connected to the front housing and a rear housing connected to the transmission case. Specifically, the front housing has a partition wall formed integral therewith substantially at the center of the front housing with respect to the vehicle longitudinal axis. The partition wall supports a drive shaft and an intermediate shaft of the sub-speed change unit in cooperation with a bearing frame that is connected to a rear side of the front housing.

According to the above arrangement, the assembling of the frame structure involves troublesome works, which include connecting the bearing frame to the rear side of the front housing while supporting the rear ends of the drive shaft and the intermediate shaft on the bearing frame, with the front ends of the drive shaft and the intermediate shaft being supported on the partition wall and the other constitutional members of the sub-speed change unit such as a friction clutch being placed within the front housing.

Another problem caused by the frame structure of the above-cited reference is that the transmission case is hard to be reduced in size since the transmission case, which accommodates a main-speed change unit, is located in the intermediate position between the front housing and the rear housing. Specifically, in the above-cited reference, transmission shafts (a hollow propeller shaft and a main shaft inserted therethrough) are disposed coaxially with a crank shaft of the engine, aiming at the reduction of the size of the front housing and the like. However, this arrangement requires the transmission shaft to be located with sufficient distance from a wall of the transmission case to provide a space for various transmission members such as gears and clutches to be mounted on the transmission shafts. Accordingly, a problem in that the transmission case is hard to be reduced in size cannot be addressed.

Another problem also lies in an arrangement of the vehicle structure of the above-cited reference in a case where a part or all of the inner space of the vehicle structure is utilized as a hydraulic fluid reservoir tank. Specifically, the hydraulic fluid stored in the reservoir tank is utilized for various hydraulic mechanisms mounted in the vehicle. Therefore, a sufficient amount of hydraulic fluid must be stored inside of the frame structure in order to avoid fluid running-out for the hydraulic mechanisms in a case where the frame structure is also used as a reservoir tank.

Specifically, variation in position or posture of the vehicle is directly reflected in the position or posture of the frame structure, since it constitutes a portion of the vehicle frame. That is, when the vehicle tilts due to such as running up or down a slope, the frame structure takes the same tilting position or posture. In such a tilting position or posture, the surface level of stored fluid is changed. Accordingly, fluid running-out for the hydraulic mechanisms is highly likely to occur when the amount of fluid stored in the reservoir tank is small. Therefore, it is necessary to store a sufficient amount of fluid inside of the frame structure in a case where the frame structure is also used as a reservoir tank.

On the other hand, hydraulic fluid stored inside of the frame structure may cause drag resistance in various transmission mechanisms placed inside of the frame structure. That is, a large amount of fluid stored inside of the frame structure may deteriorate transmission efficiency of various transmission mechanisms that are mounted also inside of the frame structure and hence immersed in the fluid.

Thus, there exist contradictory two demands, one for storing a sufficient amount of fluid so as to avoid fluid running out and another for storing a minimum amount of fluid so as to avoid causing resistance against the transmission mechanisms mounted inside of the vehicle frame. The prior frame structure is not designed to fully address these demands.

Still another problem of the prior art lies in a brake mechanism that operatively applies brake power to a pair of drive shafts that receive drive power transmitted from a power source and divided thereinto. Specifically, the brake mechanism mounted in a vehicle such as a working vehicle is required to perform individual brake operation enabling brake power to be applied individually to the pair of drive shafts to which drive power from the power source is divided and transmitted, and simultaneous brake operation enabling brake power to be simultaneously applied to the pair of drive shafts. The individual brake operation is required for example where the vehicle makes a sharp turn by applying brake power to only one of the pair of drive shafts. On the other hand, the simultaneous brake operation is used for example in a parking brake for parking the vehicle.

In order to enable the above operations, the brake mechanism includes a pair of first and second brake units that respectively apply brake power to a pair of drive shafts, as well as an operation unit for selectively performing the individual brake operation and the simultaneous brake operation.

More specifically, the operation unit is designed to actuate the first and second brake units independently of each other upon the operation of first and second individual brake operation members such as right and left pedals, and simultaneously actuate both the first and second individual brake units upon operation of a simultaneous brake operation unit such as a parking lever.

In order to achieve the above operations, a relatively complicated arrangement is required. That is, the conventional operation unit requires completely separated paths for an individual link mechanism for linking the first individual brake operation member to the first brake unit and linking the second individual brake operation member to the second brake unit in such a manner that the first and second brake units are operable individually of each other, and a simultaneous link mechanism for linking the simultaneous brake operation member to the first and second brake units in such a manner that the first and second brake units are operable in association with each other. This results in increase in number of parts and size, as well as complicated structure.

In consideration of the above prior art, it is an object of the present invention to provide a frame structure that ensures high efficiency assembly, while addressing the problems with the interconnected arrangement of a clutch housing, an intermediate housing and a transmission case along the vehicle longitudinal axis.

It is another object of the present invention to provide a frame structure that ensures high efficiency assembly as well as providing a free space above the intermediate housing, while addressing the problems with the interconnected arrangement of a clutch housing, an intermediate housing and a transmission case along the vehicle longitudinal axis.

It is still another object of the present invention to provide a frame structure that is capable of effectively preventing fluid running-out while keeping the amount of fluid stored in a reservoir tank as low as possible, which reservoir tank being constituted by at least a portion of an inner space of the frame structure that is arranged along the vehicle longitudinal axis extending from a first side to a second side of the vehicle.

It is yet another object of the present invention to provide a brake mechanism that has a simplified structure capable of independently or dependently applying brake power to a pair of drive shafts according to the selective operation by a driver.

SUMMARY OF THE INVENTION

According to one aspect of the present invention, there is provided a frame structure of a vehicle that includes a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a forward/rearward movement switching unit. The flywheel housing has a first end connected to the engine and a second open end opposite to the first end along the longitudinal axis of the vehicle. The intermediate housing has a hollow shape with a first end and a second end located along the longitudinal axis of the vehicle, the first end having an abutting surface against which the second end of the flywheel housing abuts, a support surface located radially inwardly of the abutting surface so as to support the forward/rearward movement switching unit, and an opening surrounded by the support surface, the opening serving as a first-end opening of the intermediate housing along the longitudinal axis of the vehicle. The abutting surface and the support surface along the longitudinal axis of the vehicle are located so that at least a portion of the forward/rearward movement switching unit is accommodated within the flywheel housing.

With the above arrangement, it is possible to easily connect the forward/rearward movement switching unit to the support surface of the intermediate housing. Further, the connection of the intermediate housing to the flywheel housing can be made after connecting the forward/rearward movement switching unit to the intermediate housing. As a result, it is possible to achieve high efficiency assembly.

According to another aspect of the present invention, there is provided a frame structure of a vehicle that includes a flywheel housing, an intermediate housing and a transmission case that are connected to each other along a longitudinal axis of the vehicle to constitute a vehicle frame with an inner space for accommodating a running-power transmission path for transmitting power from an engine to drive wheels via a forward/rearward movement switching unit. The flywheel housing has a first abutting surface and a second abutting surface respectively located closer to a first end and a second end of the flywheel housing along the longitudinal axis of the vehicle, in which the first abutting surface is connected to the engine, and the second abutting surface is connected to the intermediate housing. The second abutting surface has a first opening through which the forward/rearward movement switching unit can pass. The flywheel housing has a hollow shape with a center axis substantially coaxial with a crank shaft of the engine. The intermediate housing has a hollow body portion and a flange portion. The hollow body portion has a first end and a second end and extending along the longitudinal axis of the vehicle with a center axis displaced downward from the crank shaft. The flange portion is located closer to the first end of the hollow body portion, and the flange portion has an opening in a radial center thereof, in which the opening of the flange portion serves as a first-end opening of the intermediate housing along the longitudinal axis of the vehicle. The flange portion has a radially outward portion radially outwardly extending from an upper part of the body portion and a radially inward portion radially inwardly extending from a lower part of the body portion, so that an abutting surface located opposite to the second abutting surface of the flywheel housing, a support surface located radially inward of the abutting surface so as to support the forward/rearward movement switching unit, and the first-end opening located radially inward of the support surface are defined.

With the above arrangement, it is possible to improve efficiency in mounting the forward/rearward movement switching unit to the intermediate housing and connecting the intermediate housing to the flywheel housing, while locating a top wall of the intermediate housing as low as possible. Accordingly, it is possible to mount a step bar or board, which is to be mounted above the intermediate housing, on a lower portion.

In the above arrangement, preferably, the abutting surface and the support surface along the longitudinal axis of the vehicle are located so that at least a portion of the forward/rearward movement switching unit is accommodated within the flywheel housing.

In one embodiment, the forward/rearward movement switching unit includes a reverser housing supported on the support surface and a reverser unit accommodated in the reverser housing. The reverser housing has a reverser housing body having an end wall that abuts the support surface so as to close the first opening of the intermediate housing and a peripheral wall extending from a peripheral edge of the end wall towards a first side of the vehicle along the longitudinal axis of the vehicle, and a lid for closing a first end of the reverser housing body along the longitudinal axis of the vehicle. The reverser housing is arranged so as to seal an inner space of the flywheel housing against the inner space of the intermediate housing in a liquid tight manner.

Preferably, the transmission case accommodates a main-speed change unit of the running-power transmission path, and the intermediate housing has a transmission shaft passing therethrough to connect the forward/rearward movement switching unit to the main-speed change unit. This arrangement simplifies the structure of the intermediate housing.

The frame structure may further includes a center plate interposed between the intermediate housing and the transmission case so as to bearing-support the transmission shaft.

According to another aspect of the present invention, there is provided a frame structure of a vehicle extending from a first side to a second side of the vehicle along a longitudinal axis of the vehicle so as to constitute a vehicle frame as providing an inner space, in which at least a portion of the inner space defines a hydraulic fluid reservoir space. The hydraulic fluid reservoir space has a partition wall that divides the hydraulic fluid reservoir space into a filter housing portion for accommodating a filter and a main portion other than the filter housing portion. The partition wall has a communication port for communication between the filter housing portion and the main portion in a lower region of the hydraulic fluid reservoir space.

The thus arranged frame structure is capable of securely getting hydraulic fluid out of the fluid reservoir space, while keeping the amount of hydraulic fluid stored therein as low as possible. Accordingly, it is possible to effectively prevent running-out of hydraulic fluid during hydraulic fluid is drawn out of the frame structure, while preventing deterioration in power transmission efficiency of power transmission mechanisms placed inside of the frame structure.

Preferably, the partition wall is located so as to have the communication hole located substantially at the center of the hydraulic fluid reservoir space with respect to a vehicle width direction. This arrangement makes it possible to effectively prevent the fluid running-out even when the vehicle has tilted forward or rearward such as running up or down a slope.

Preferably, the partition wall is located so as to have the communication hole located substantially at the center of the hydraulic fluid reservoir space with respect to the longitudinal axis of the vehicle. This arrangement makes it possible to effectively prevent the fluid running-out when the vehicle makes a turn and tilts rightward or leftward.

More preferably, the frame structure is arranged so that an oil heater can be installed in proximity of the communication hole. This arrangement makes it possible to efficiently heat hydraulic fluid drawn out of the frame structure and hence effectively prevent deterioration in hydraulic effect due to deterioration of the viscosity of hydraulic fluid such as during cold season.

In one embodiment, the frame structure includes a flywheel housing, an intermediate housing and a transmission case that are connected to each other along the longitudinal axis of the vehicle. In this arrangement, a connection portion between the intermediate housing and the transmission case is arranged to enable fluid communication between the inner spaces of the intermediate housing and the transmission case, while a connection portion between the intermediate housing and the flywheel housing is arranged to provide fluid tight seal between the inner spaces of the intermediate housing and the flywheel housing. Whereby, the inner spaces of the flywheel housing, the intermediate housing and the transmission case are divided into a space of a dry chamber for accommodating a flywheel and the hydraulic fluid reservoir space.

Preferably, in the above embodiment, the connection portion between the flywheel housing and the intermediate housing, and the connection portion between the intermediate housing and the transmission case respectively have openings, through which a transmission shaft can pass. The opening of the connection portion between the flywheel housing and the intermediate housing is closed with a transmission unit that is supported by an adjacent surface of the intermediate housing to the flywheel housing.

In the above embodiment, for example, the transmission case has a bulge that extends in the vehicle width direction as extending from an opening of the first end of the transmission case towards the second end of the transmission case along the longitudinal axis of the vehicle, in which the bulge provides a space for the filter housing portion so that a filter can be installed in place by introducing the same from the first side of the longitudinal axis of the vehicle.

According to still another aspect of the present invention, there is provided a brake mechanism for independently or dependently applying brake power to first and second drive shafts on the basis of operation by driver. The first and second drive shafts are connected to right and left wheels in such a manner as to be operable in association with each other.

The brake mechanism includes first and second brake units for applying brake power respectively to the first and second drive shafts, and a brake operation unit for selectively actuating the first and second brake units independently to each other or dependently to each other on the basis of operation by driver. The brake operation unit includes: a brake operation shaft; a first actuation member relatively rotatably mounted on the brake operation shaft, the first actuation member being operatively connected to the first brake unit; a first brake connection member being constructed so as to be connected to a first link mechanism that is operated in association with a first brake operation member that is operable by driver and a common link mechanism that is operated in association with a common brake operation member that is operable by driver, the first brake connection member being also constructed so as to rotate the first actuation member around the brake operation shaft by the operation of any one of the first brake operation member and the common brake operation member by driver; a common brake connection member being constructed so as to be connected to the common link mechanism and rotate the brake operation shaft around the axis on the basis of operation of the common brake operation member by driver; a second actuation member relatively non-rotatably mounted on the brake operation shaft, the second actuation member being operatively connected to the second brake unit; and a second brake connection member being constructed so as to be connected to a second link mechanism that is operated in association with a second brake operation member that is operable by driver and rotate the second actuation member around the axis of the brake operation shaft on the basis of operation of the second brake operation member by driver.

The first brake connection member is constructed so as to have a lost motion relationship with one of the first link mechanism and the common link mechanism when the first brake connection member is actuated via another one of the first link mechanism and the common link mechanism. The common brake connection member is constructed so as to have a lost motion relationship with the common link mechanism when the second brake connection member is actuated via the second link mechanism. The second brake connection member is constructed so as to have a lost motion relationship with the second link mechanism when the common brake connection member is actuated via the common link mechanism.

With the above arrangement, it is possible to simplify the structure of the brake mechanism that can independently or dependently apply brake power to a par of drive shafts according to the selective operation by the driver.

Preferably, the first and second brake units are respectively brake actuators that each are rotated according to the rotation of a corresponding one of the first and second actuation members around the brake operation shaft. The brake actuators each are designed to apply brake power to a corresponding one of the first and second drive shafts according to a rotational motion of its own.

In one embodiment, each of the first and second brake units includes: a drive-side brake disk axially movable and relatively non-rotatable relative to a corresponding one of the first and second brake shafts; a fixed-side brake disk axially movable relative to the corresponding one of the first and second brake shafts, the fixed-side brake disk located opposite to the drive-side brake disk; a brake cover connected to a transmission case so as to cover the drive-side brake disk and the fixed-side brake disk, the transmission case supporting the first and second drive shafts; a brake actuator rotatably located between a group of the drive-side brake disk and the fixed-side brake disk, and an inner circumference of the brake cover, the brake actuator being designed to press the drive-side brake disk and the fixed-side brake disk into frictional engagement with each other according to a rotational motion of its own; and a stop member located opposite to the brake actuator, with the group of the drive-side brake disk and the fixed-side brake disk therebetween, so as to define a limit of the axial motions of the drive-side and fixed-side brake disks. The stop member has a center hole for bearing-support of the corresponding drive shaft and any one of a hole and a cutout for bearing-support of the corresponding operation member, the stop member being secured to any one of the transmission case and the corresponding brake cover. In this embodiment, the operation member is straddle-mounted by both the corresponding brake cover and the corresponding stop member. This arrangement makes the operation member securely operable. Also, the fixed-side brake units each may be non-rotatably secured in position by the corresponding operation member. This arrangement can simplify the structure for fixing the fixed-side brake disk.

Preferably, the fixed-side brake disks of the first and second brake units each have a center hole located at the radial center thereof, through which a corresponding one of the drive shafts pass, and any one of a recess or protrusion for fitting engagement with the corresponding operation member, the fixed-side brake disks each are non-rotatably secured in position by the corresponding operation member.

For example, in each of the first and second brake units, cam balls are provided between the brake actuator and the brake cover, and one of the adjacent surfaces of the brake actuator and the brake cover has holding recesses and another one of the adjacent surfaces has tapered grooves so that the cam balls are respectively engaged into holding recesses and the tapered grooves. The tapered grooves each have a deepest portion and a tapered portion that gradually decreases in depth as it advances from the deepest portion in the circumferential direction. The operation member has a tubular portion mounted on the brake operation shaft and a cam portion radially outwardly extending from the tubular portion; and the brake actuator has a cam follower portion that is engaged with the cam portion of the operation member.

For example, the first brake connection member has a tubular body relatively non-rotatably mounted on the first actuation member and a connection portion radially outwardly extending from the tubular body. The common brake connection member has a tubular body relatively non-rotatably mounted on the brake operation shaft and a connection portion radially outwardly extending from the tubular body. The connection portion of the first brake connection member has a first brake groove extending throughout a predetermined length in the circumferential direction with reference to the brake operation shaft so that the first link mechanism is engaged into the first brake groove, and a common brake groove extending throughout a predetermined length in the circumferential direction with reference to the brake operation shaft so that the common link mechanism is engaged into the common brake groove of the first brake connection member. The connection portion of the common brake connection member has a common brake groove extending throughout a predetermined length in the circumferential direction with reference to the brake operation shaft so that the common link mechanism is engaged into the common brake groove of the common brake connection member. The common brake grooves of the first brake connection member and the common brake connection member are formed in the same position with respect to the circumferential direction with the axis of the brake operation shaft as a reference. The first brake groove of the first brake connection member is displaced from the common brake grooves with respect to the circumferential direction.

In the above embodiment, preferably, the second brake connection member has a tubular body relatively non-rotatably mounted on the second actuation member and a connection portion radially outwardly extending from the tubular body. The connection portion of the second brake connection member has a second brake groove extending throughout a predetermined length in the circumferential direction with reference to the brake operation shaft so that the second link mechanism is engaged into the second brake groove. The second brake groove is formed in the same position as the first brake groove with respect to the circumferential direction with the axis of the brake operation shaft as a reference.

The pair of drive shafts are a pair of differential yoke shafts mounted in a differential gear unit in a running-power transmission path extending from the power source to drive wheels.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENT

Figure 1:
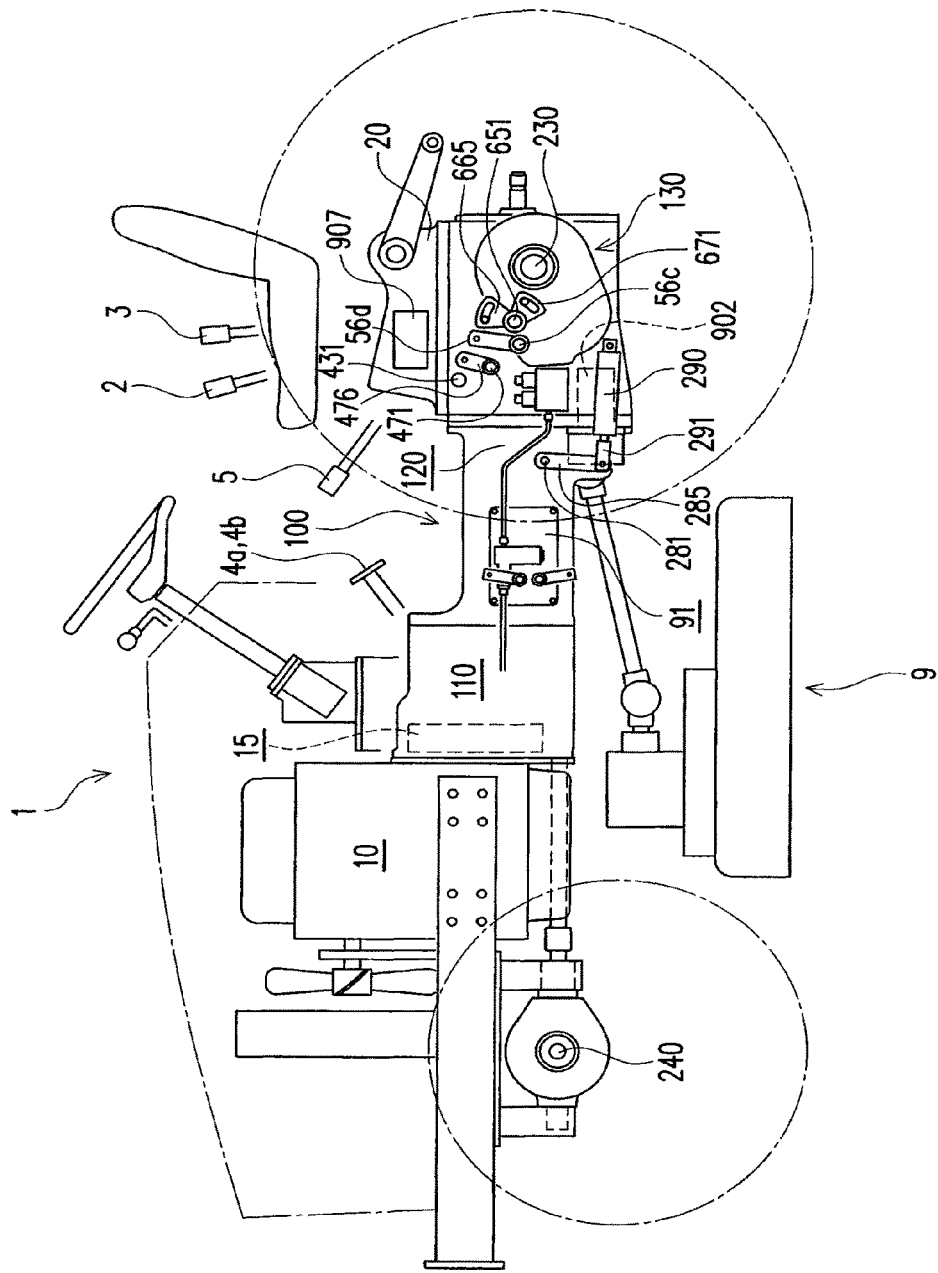
FIG. 1 is a schematic side view of a vehicle, to which the frame structure according to one embodiment of the present invention has been applied.
Figure 2:
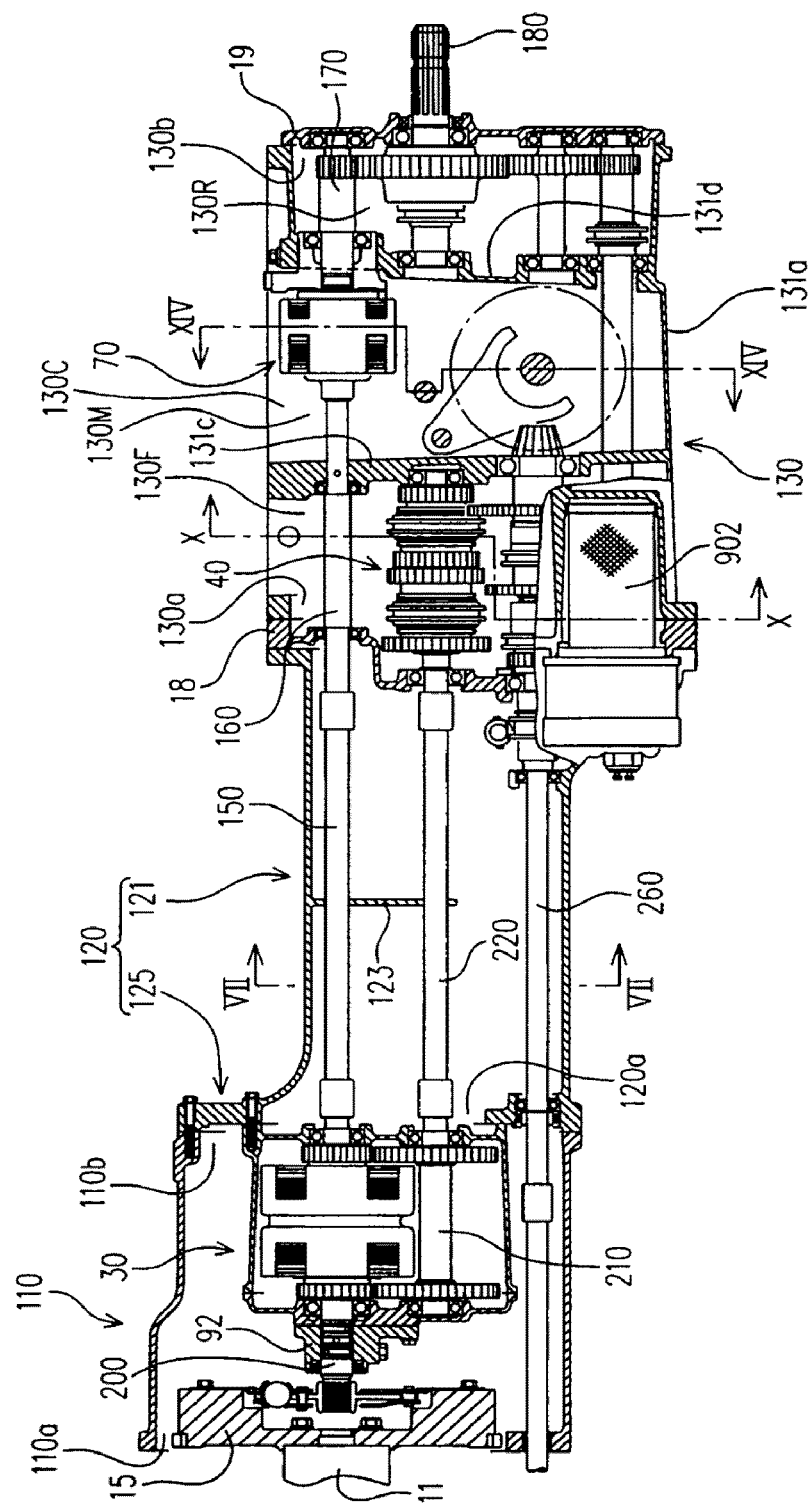
FIG. 2 is a side view of the frame structure of FIG. 1 in longitudinal cross section.

The description will be made for a preferred embodiment of the present invention with reference to the accompanied drawings. FIG. 1 is a schematic side view of a working vehicle 1, to which the frame structure of this embodiment has been applied. FIG. 2 is a side view of the frame structure in longitudinal cross section.

As illustrated in FIGS. 1 and 2, a frame structure 100 of this embodiment constitutes at least a portion of the vehicle frame. Specifically, the frame structure 100 includes a flywheel housing 110 connected to an engine 10, an intermediate housing 120 connected to the flywheel housing 110 and a transmission case 130 connected to the intermediate housing 120.

Figure 3:
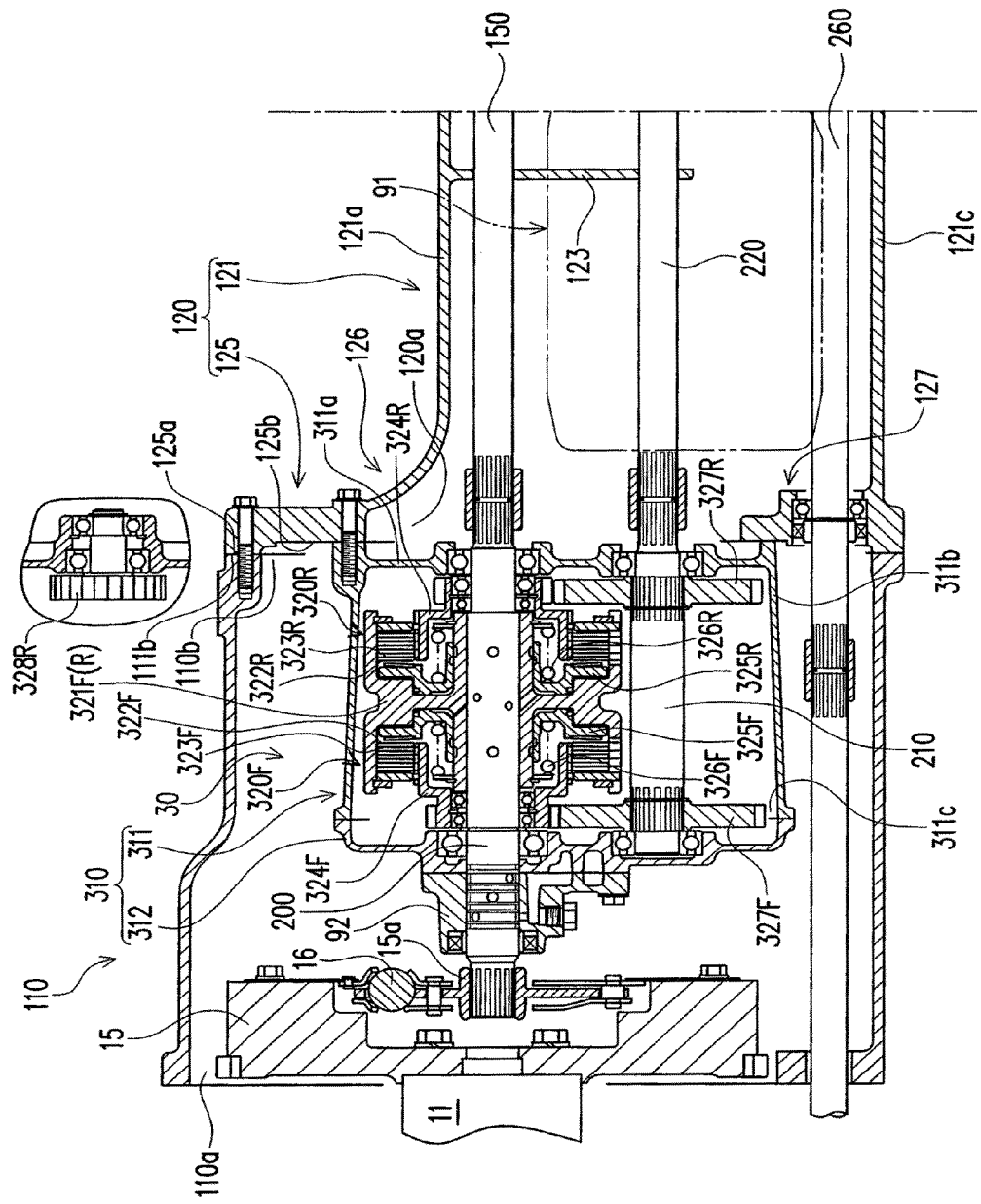
FIG. 3 is an enlarged view of a flywheel housing of the frame structure of FIGS. 1 and 2 in longitudinal cross section.
Figure 4:
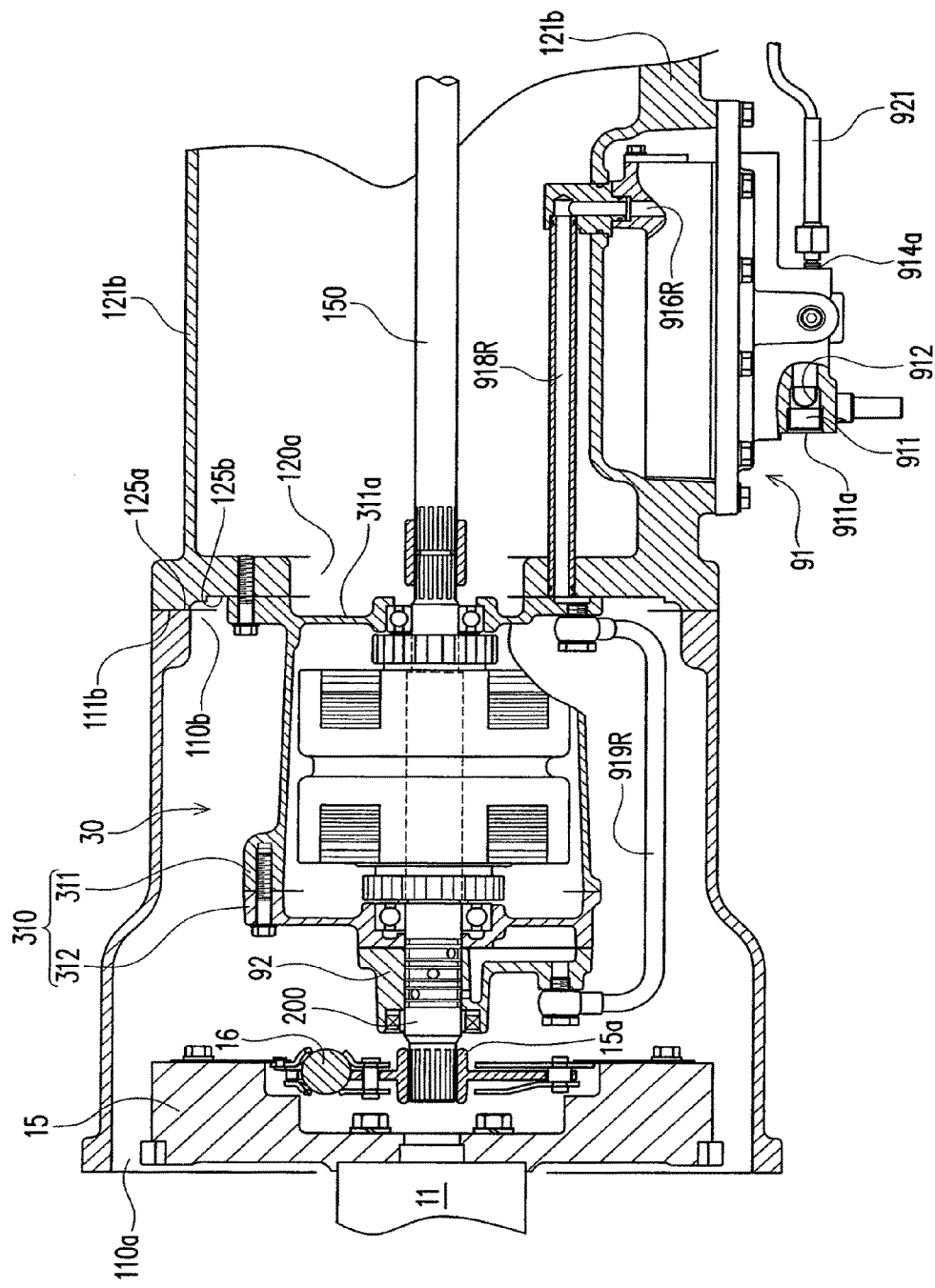
FIG. 4 is an enlarged view of the flywheel housing of FIG. 3 in lateral cross section.

FIGS. 3 and 4 are respectively enlarged views of the flywheel housing in longitudinal and lateral cross sections. As illustrated in FIGS. 1 to 4, the flywheel housing 110 has a first end and a second end along the vehicle longitudinal axis (hereinafter sometimes referred to a first longitudinal end and a second longitudinal end), which ends respectively have a first opening 110a and a second opening 110b, and a hollow shape with a center axis substantially coaxial with a crank shaft 11 of the engine. The first opening 110a is sized to allow a flywheel 15, which is operatively connected to the engine 10, to pass therethrough. The second opening 110b is sized to allow a forward/rearward movement switching unit 30 (hereinafter described) to pass therethrough. The first end of the flywheel housing 110 is connected to the engine so that the flywheel housing 110 is aligned along the vehicle longitudinal axis.

In this embodiment, the engine 10 is located on the front side of the vehicle along the vehicle longitudinal axis. As used throughout the description, the first and second longitudinal ends along the vehicle longitudinal axis respectively represent the front and rear sides of the vehicle and therefore will be replaced with them according to need and circumstance in the following description. Also, the directional terms such as forward and rearward are used in reference to the vehicle longitudinal axis.

Figure 5:
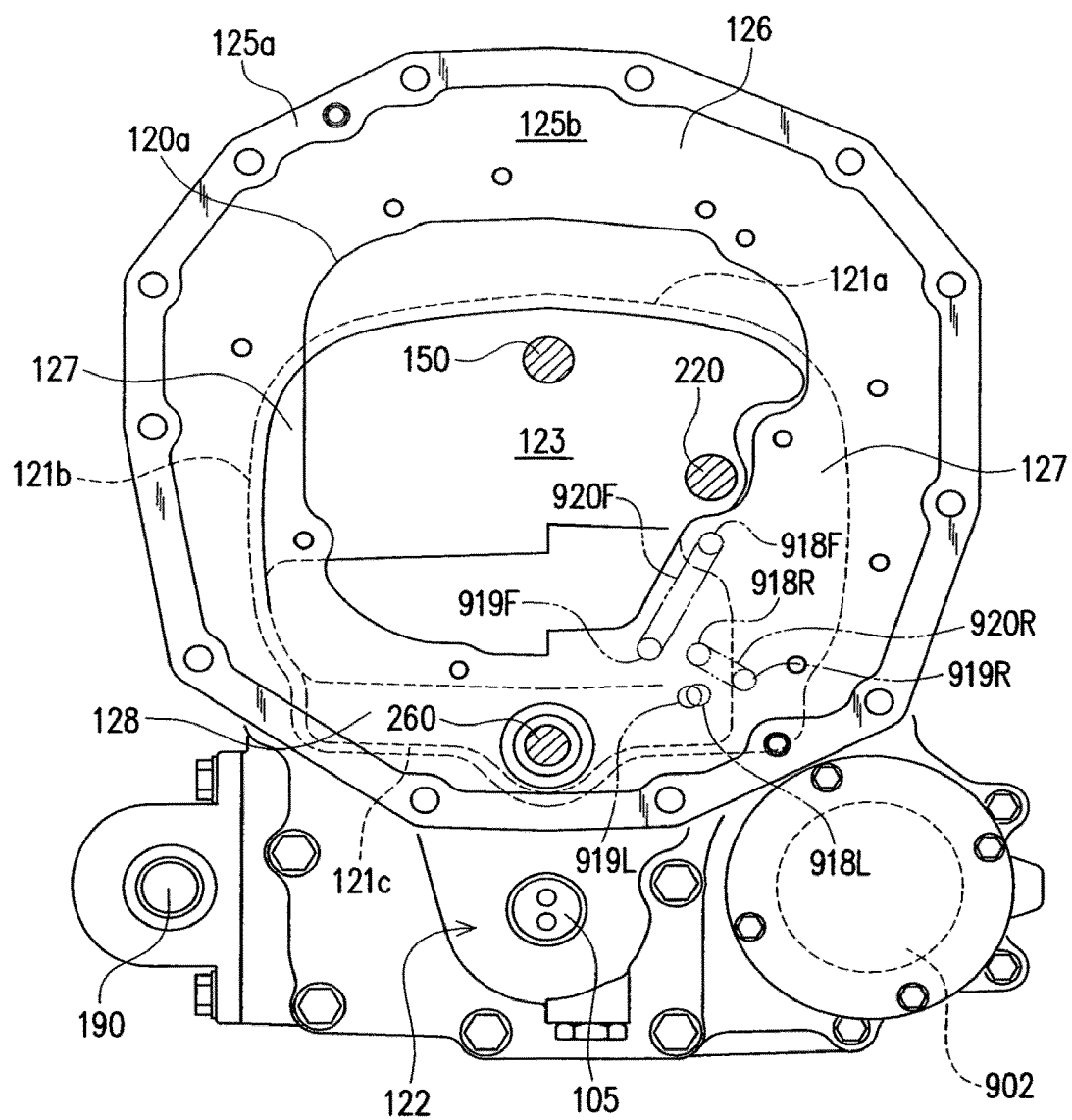
FIG. 5 is a front side view of an intermediate housing in the frame structure of FIGS. 1 and 2, with a forward/rearward movement switching unit removed.
Figure 6:
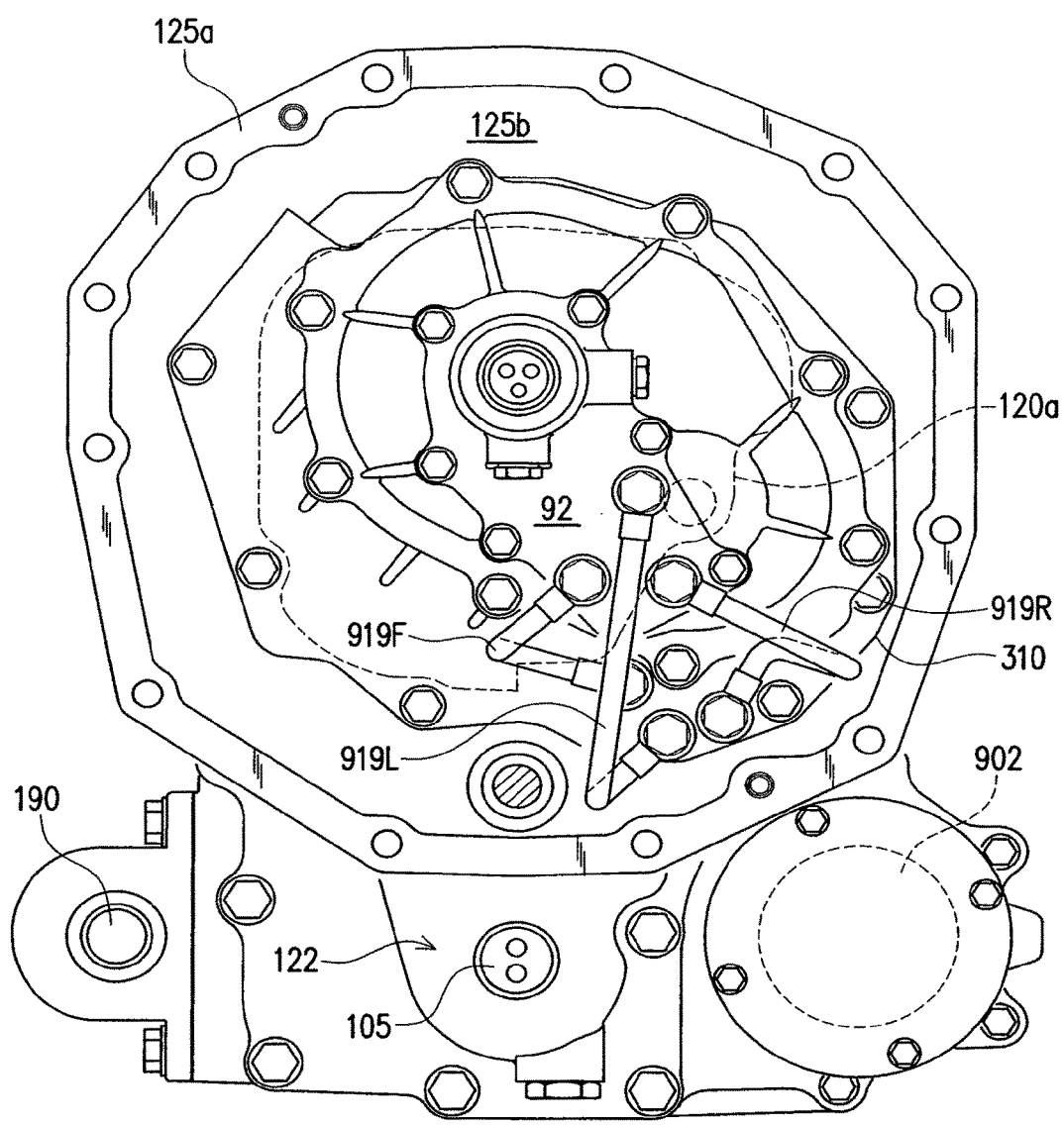
FIG. 6 is a front side view of the intermediate housing in the frame structure of FIGS. 1 and 2, with the forward/rearward movement switching unit mounted therein.

The intermediate housing 120 includes a hollow body portion 121 extending along the vehicle longitudinal axis and a front flange portion 125 located forward of the body portion 121. The front flange portion 125 provides a support area for the forward/rearward movement switching unit 30 as well as an area for connection with the flywheel housing 110. FIG. 5 is a front side view of the intermediate housing with the forward/rearward movement switching unit 30 removed. FIG. 6 is a front side view of the intermediate housing with the forward/rearward movement switching unit 30 mounted therein.

Specifically, as illustrated in FIGS. 5 and 6, the front flange portion 125 has a forward end (an end faces to the first side of the vehicle longitudinal axis), of which a radially outward portion forms an abutting surface 125a that provides an area for connection with the flywheel housing 110.

The abutting surface 125a is designed to be brought into abutment with a rear end 111b (an end faces to the second end of the vehicle longitudinal axis) of the flywheel housing 110. The front flange portion 125 has a support surface 125b located radially inward of the abutting surface 125a of the forward end so as to provide a support area for the forward/rearward movement switching unit 30.

The front flange portion 125 has an opening 120a defined by the support surface 125b. The opening 120a is formed in communication with a hollow area of the hollow body portion 121 and thus forms a front opening (an opening closer to the first side of the vehicle longitudinal axis).

Now, the description will be made for the forward/rearward movement switching unit 30 supported on the support surface 125b.

As best illustrated in FIGS. 3 and 4, the forward/rearward movement switching unit 30 includes a reverser unit 300 for switching the power transmission direction from a drive shaft 200 to a driven shaft 210 located parallel to the drive shaft 200, in which the drive shaft 200 extends along the vehicle longitudinal axis to have a front end operatively connected to an output portion 15a of a flywheel 15, and a reverser housing 310 for accommodating the reverser unit 300 as well as supporting the drive shaft 200 and the driven shaft 210. In these Figures, a reference numeral 16 represents a damper mounted in the flywheel 15.

The reverser housing 310 includes a housing body 311 supported on the support surface 125b and a lid 312 connected to the housing body 311. Specifically, the housing body 311 has an end wall 311a connected to the support surface 125b to cover the opening 120a located on the front side of the housing body 311 and a peripheral wall 311b extending forward from a peripheral edge of the end wall 311a, and has a front opening 311c, through which the reverser unit 300 can pass. The lid 312 is connected to the housing body 311 to close the front opening 311c of the housing body 311.

In this embodiment, of the inner space of the flywheel housing 110, a portion for accommodating the flywheel 15 (a flywheel accommodation space) is designed to be sealed against the inner space of the intermediate housing 120 in a liquid tight manner.

That is, the end wall 311a of the housing body 311 with the front opening 120a covered thereby is connected to the support surface 125b. The housing body 311 and the lid 312 together provide a liquid tight separation between the inner space of the reverse housing 310 and the flywheel accommodating space. With this arrangement, the inner spaces of the intermediate housing and the reverser housing can be used as a hydraulic fluid chamber and the flywheel accommodating space as a dry chamber. The inner space of the intermediate housing 120 is held in fluid communication with the inner space of the reverser housing 310 via a bearing hole or the like formed in the end wall 311a.

The drive shaft 200 and the driven shaft 210 are respectively supported by the reverser housing 310 in such a manner as to be axially rotatable. Specifically, the front end of the drive shaft 200 extends forward through the lid 312 to be operatively connected to the output portion 15a of the flywheel 15, and the rear end of the same extends through the end wall 311a of the housing body 311 to be connected to a downstream transmission member. The front end of the driven shaft 210 is supported on a bearing-support recess formed in the lid 312, and the rear end of the same extends through the end wall 311a of the housing body 311 to be connected to a downstream transmission member.

In this embodiment, the reverser unit 300 is designated as a hydraulic friction clutch. Specifically, the reverser unit 300 has a friction clutch device 320F for forward running and a friction clutch device 320R for rearward running.

The friction clutch device 320F for forward running includes a clutch housing 321F relatively non-rotatably supported on the drive shaft 200, a drive-side friction plate 322F relatively non-rotatably and axially slidably supported on the clutch housing 321F, a driven-side friction plate 323F located opposite to the drive-side friction plate 322F, a clutch gear 324F relatively rotatably supported on the drive shaft 200 while relatively non-rotatably and axially slidably supporting the driven-side friction plate 323F, a piston 325F axially slidably held in the clutch housing 321F and adapted to bring the drive-side friction plate 322F and the driven-side friction plate 323F into abutment with each other by the hydraulic action, a spring 326F for moving the piston 325F away from the drive-side friction plate 322F and the driven-side friction plate 323F, and an output gear 327F relatively non-rotatably supported on the driven shaft 210 while being in meshed engagement with the clutch gear 324F. The friction clutch device 320F for forward running takes a clutch-engaging mode to apply hydraulic pressure to the piston 325F (power transmission mode) and a clutch-disengaging mode to release the piston 325F from hydraulic pressure applied state.

The friction clutch device 320R for rearward running has the same arrangement as that of the friction clutch device 320F except for the arrangement with a clutch gear 324R and an output gear 327R held in meshed engagement with an idle gear 328R (see FIG. 3). Accordingly, "R" is suffixed to each of the reference codes of the identical or corresponding parts of the friction clutch device 320R to omit the detailed description thereof. In this embodiment, for the purpose of reducing the number of parts, clutch housings 321F and 321R of the friction clutch device 320F and the friction clutch device 320R are integrally formed.

Thus, in the frame structure 100 of this embodiment, the intermediate housing 120 has, on its front side, the abutting surface 125a for abutment with the rear end of the flywheel housing 110, the support surface 125b located radially inward of the abutting surface 125a to support the forward/rearward movement switching unit 30, and the opening 120a defined by the support surface 125b to allow the transmission shafts respectively on the downstream sides of the drive shaft 200 and the driven shaft 210 (a main shaft 150 and a propeller shaft 220 in this embodiment) to pass therethrough.

According to the above arrangement, the forward/rearward movement switching unit 30 is introduced from the front side of the intermediate housing 120 and connected to the support surface 125b, and then the intermediate housing 120 is connected to the flywheel housing 110 via the abutting surface 125a. This achieves ease of connection between the flywheel housing 110 and the intermediate housing 120 with the forward/rearward movement switching unit 30 held therein and hence contributes to improved assembly efficiency.

Preferably, the positions of the abutting surface 125a and the support surface 125b along the vehicle longitudinal axis are determined so as to allow at least a portion of the forward/rearward movement switching unit 30 supported on the support surface 125b to be positioned within the flywheel housing 110 in a state with the flywheel housing 110 connected to the flywheel housing 110.

That is, where the support surface 125b is located with a great distance away from the abutting surface 125a towards the second side of the vehicle longitudinal axis (towards the rear side in this embodiment), the forward/rearward movement switching unit 30 is entirely placed in the intermediate housing 120. This greatly widens the distance between the forward end of the intermediate housing 120a and the support surface 125b, and hence lowers efficiency in mounting the forward/rearward movement switching unit 30 to the support surface 125b.

Contrarily to the above, by positioning the abutting surface 125a and the support surface 125b along the vehicle longitudinal axis so that at least a portion of the forward/rearward movement switching unit 30 supported on the support surface 125b is positioned within the flywheel housing 110, it is possible to achieve an improved efficiency in mounting the forward/rearward movement switching unit 30 to the support surface 125b.

In a more preferable arrangement, the support surface 125b is positioned at the same level as or forward of the abutting surface 125a along the vehicle longitudinal axis. This arrangement can achieve a further improved efficiency in mounting the forward/rearward movement switching unit 30.

The frame structure 100 of this embodiment can achieve an improved efficiency in mounting the forward/rearward movement switching unit 30 and connecting the flywheel housing 110 to the intermediate housing 120, as well as securing a free space above the intermediate housing 120 as much as possible. This point will be mentioned in detail below.

As best illustrated in FIG. 2, in this embodiment, while the forward/rearward movement switching unit 30 is accommodated in the flywheel housing 110 and a main-speed change unit 40, a PTO clutch unit 70 and the like (hereinafter described) are accommodated in the transmission case 130, no transmission units such as a speed change mechanism and a clutch mechanism are disposed in the intermediate housing 120. That is, only the transmission shafts such as a main shaft 150 and a propeller shaft 220 respectively connected to the drive shaft 200 and the driven shaft 210 are accommodated in the intermediate housing 120. In this arrangement, there is no need to mount gears, friction plates and the like on the transmission shafts such as the main shaft 150. Accordingly, the transmission shafts can be located in proximity with a wall of the intermediate housing 120.

The above points were taken into account in the frame structure 100 of this embodiment. Accordingly, the hollow body portion 121 has a center axis displaced downward from a center axis of the flywheel housing 110 so as to locate a top wall 121a of the hollow body portion 121 of the intermediate housing 120 as close as possible to the transmission shaft (the main shaft 150 in this embodiment). The front flange portion 125 of the intermediate housing 120 has a lower side located substantially at the same level as that of the hollow body portion 121, and an upper side higher than that of the hollow body portion 121 so as to enable the connection between the flywheel housing 110 and the hollow body portion 121 with their center axes displaced from each other.

That is, as illustrated in FIG. 5, the front flange portion 125 has an upper extension 126 extending from the top wall 121a of the hollow body portion 121 towards the radially outward side or upper side of the hollow body portion 121, a lateral extension 127 extending from a lateral wall 121b of the hollow body portion 121 towards the radially outer and inner sides of the hollow body portion 121, and a lower extension 128 extending from a bottom wall 121c of the hollow body portion 121 towards the radially inner side or upper side of the hollow body portion 121, so that the abutting surface 125a located opposite to the rear end 111b of the flywheel housing 110, the support surface 125b located radially inward of the abutting surface 125a to support the forward/rearward movement switching unit 30, and the front opening 120a located radially inward of the support surface 125b are respectively defined.

Thus, in the frame structure 100, substantially only the transmission shaft is present in the intermediate housing 120, thereby displacing the axis of the hollow body portion 121 of the intermediate housing 120 downward from the axis of the flywheel housing 110 so as to locate the top wall of the hollow body portion 121 as close as possible to the transmission shaft, and connecting the flywheel housing 110 by the front flange portion 125 to the hollow body portion 121 with both axes displaced from each other.

The above arrangement can provide a free space above the hollow body portion 121, thereby providing an improved deign flexibility in designing a vehicle. Particularly, when a step bar or board is to be mounted on the top wall 121a of the hollow body portion 121 (see FIG. 1), it can be mounted as low as possible by the above arrangement, thereby enabling the driver to easily getting on and off the driver seat.

Now, the description will be made for the connection structure between the intermediate housing 120 and the transmission case 130.

Figure 7:
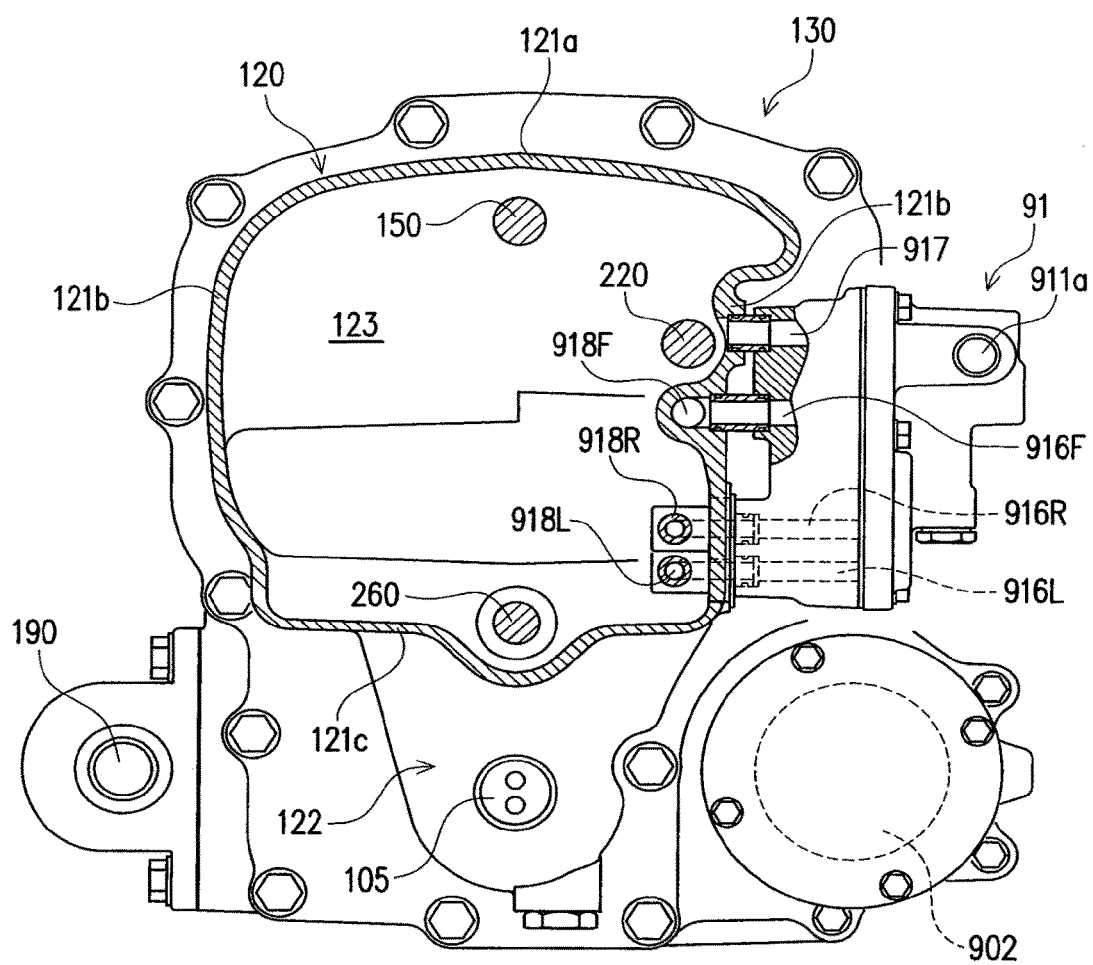
FIG. 7 is a cross sectional view taken along a line VII-VII in FIG. 2.
Figure 8:
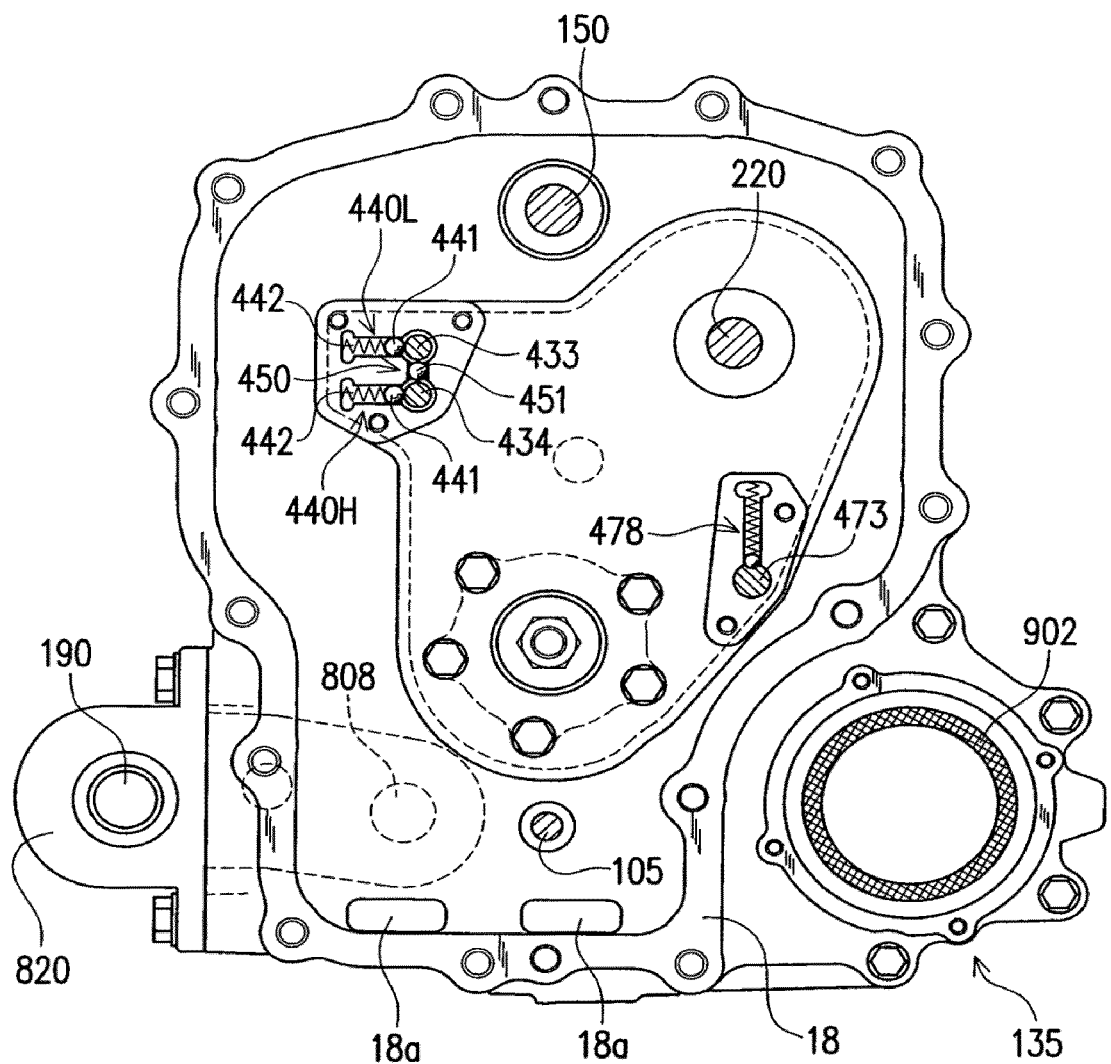
FIG. 8 is a front side view of a transmission case in the frame structure of FIGS. 1 and 2.
Figure 9:
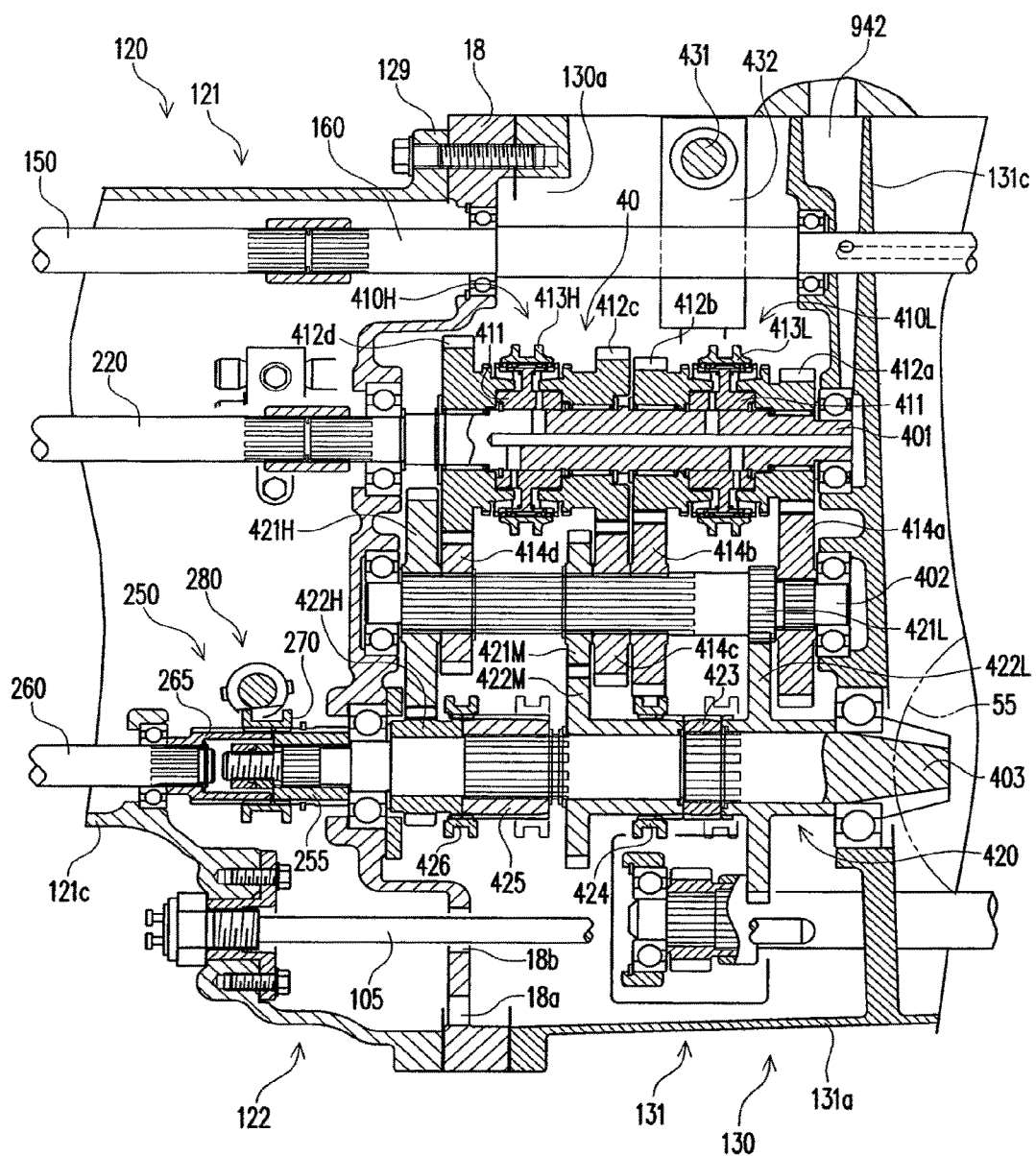
FIG. 9 is a side view of a connection portion between the intermediate housing and the transmission case and its periphery in longitudinal cross section.

FIG. 7 is a cross sectional view taken along a line VII-VII in FIG. 2. FIG. 8 is a front side view of the transmission case 130. FIG. 9 is a side view of a connection portion between the intermediate housing 120 and the transmission case 130 and its periphery in longitudinal cross section.

As illustrated in FIG. 9, the intermediate housing 120 includes a rear flange portion 129 located rearward of the hollow body portion 121. In this embodiment, the bottom wall 121c of the hollow body portion 121 has a rear end that downwardly bulges to form a downward bulge 122 that is designed to allow a heater (hereinafter described) to be mounted therein from the outside (from the front side in this embodiment).

The intermediate housing 120 is separably connected via a center plate 18 to the transmission case 130 for accommodating various transmission mechanisms (hereinafter described). The center plate 18 acts as a bearing member for transmission shafts respectively downstream to the drive shaft 200 and the driven shaft 210.

According to the thus arranged frame structure 100 of this embodiment, bearing members, which require complicated manufacturing process to be manufactured, are formed independently of cast parts, namely the flywheel housing 110, the intermediate housing 120 and the transmission case 130, as many as possible, aiming at achieving a simplified structure of the cast parts, namely the flywheel housing 110, the intermediate housing 120 and the transmission case 130, and hence reduction of the manufacturing cost.

That is, in the frame structure 100 of this embodiment, as described above, the drive shaft 200 and the driven shaft 210 are supported by the reverser housing 310 mounted on the support surface 125b of the intermediate housing 120, and the hereinafter described various transmission shafts respectively downstream to the drive shaft 200 and the driven shaft 210 are supported by the center plate 18. Accordingly, it is possible to reduce the number of downstream processes subjected to the flywheel housing 110, the intermediate housing 120 and the transmission case 130 made by casting, such as boring bearing holes, as much as possible, and hence reduce the manufacturing cost.

Now, the description will be made for the transmission mechanism of the vehicle 1, to which the frame structure 100 of this embodiment has been applied. The detailed structure of the transmission case 130 will be described later.

The vehicle 1 has a running-power transmission mechanism for transmitting power from a power source 10 to the drive wheels, and a PTO transmission mechanism for transmitting power from the drive source 10 to an attached device such as a mower. First, the description will be made for the running-power transmission mechanism.

The running-power transmission mechanism includes the drive shaft 200 operatively connected to the engine 10 via the flywheel 15, the driven shaft 210 located substantially parallel to the drive shaft 200, the forward/rearward movement switching unit 30 for switching the power transmission direction from the drive shaft 200 to the driven shaft 210 and shutting off the power transmission, the propeller shaft 220 extending along the vehicle longitudinal axis and connected to the driven shaft 210 in such a manner as to be relatively non-rotatably around the axis, the main-speed change unit 40 located downstream of the propeller shaft 220 with respect to the power transmission direction, and a differential gear unit 50 for transmitting power from the main-speed change unit 40 to a pair of main transmission shafts (a pair of rear axles in this embodiment), enabling them to be rotated at different speeds.

As best illustrated in FIG. 2, the propeller shaft 220 has a front end connected to the driven shaft 210 in such a manner as to be relatively non-rotatably around the axis and a rear end supported by the center plate 18. Preferably, the hollow body portion 121 of the intermediate housing 120 is integrally formed with a bearing wall 123 that extends radially inwardly from an inner circumference of the top wall 121a, so that a center portion of the propeller shaft 220 can be bearing-supported by the bearing wall 123. With the above arrangement, it is possible to support the propeller shaft 220 in a secure manner.

Figure 10:
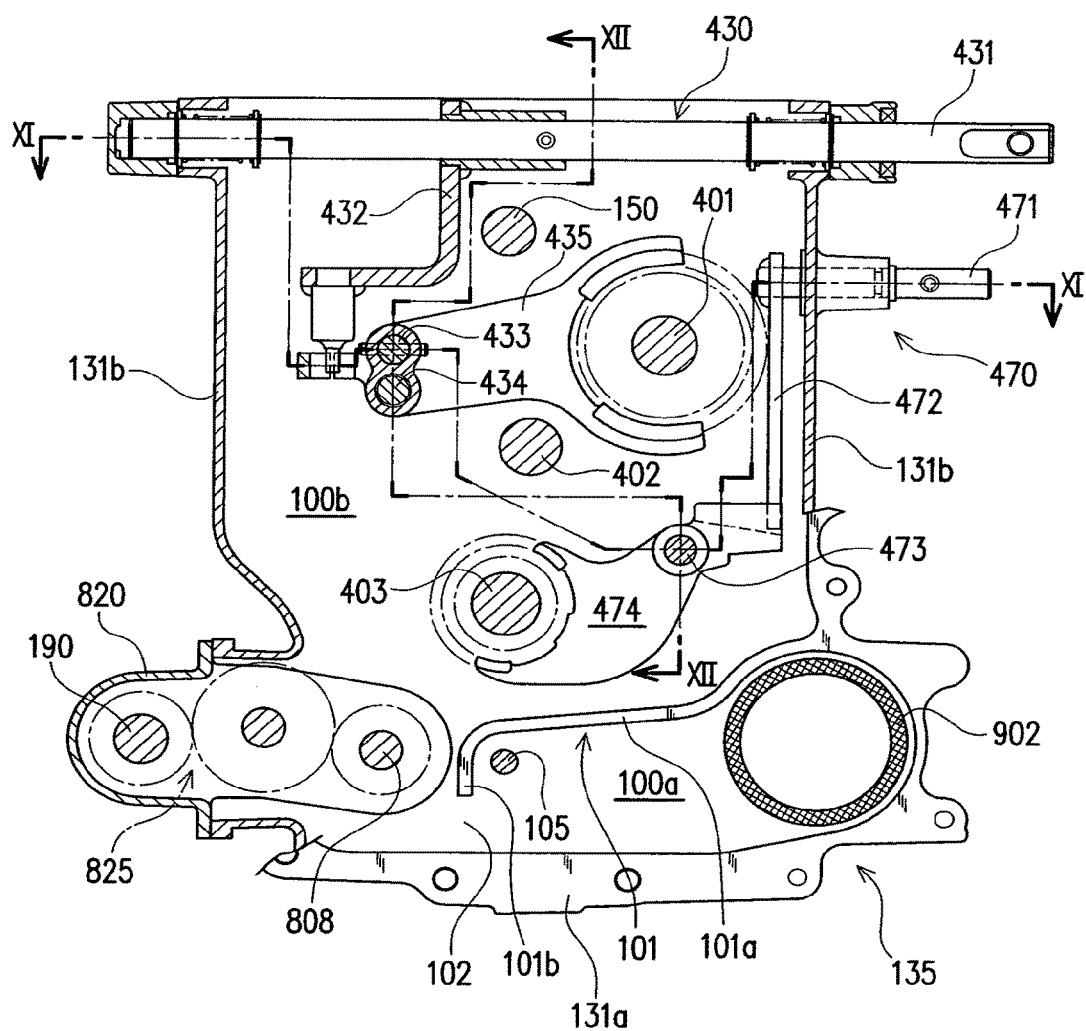
FIG. 10 is a cross sectional view taken along a line X-X in FIG. 2.

The main-speed change unit 40 is accommodated in the transmission case 130, as illustrated in FIG. 2. Now, the description will be made for the structure of the transmission case 130. FIG. 10 is a cross sectional view taken along a line X-X in FIG. 2.

As illustrated in FIGS. 2 and 10, the transmission case 130 has a body portion 131 having a front opening 130a and a rear opening 130b, in which the body portion has a bottom wall 131a extending along the vehicle longitudinal axis, a pair of lateral walls 131b extending upwardly from the opposite sides of the bottom wall 131a with respect to the vehicle widthwise direction, a first intermediate wall 131c extending upwardly from an inner circumference of the bottom wall 131a in such a manner as to divide an inner space defined by the bottom wall 131a and the pair of side walls 131b into a front section and a rear section, and a second intermediate wall 131d located rearward of the first intermediate wall 131c and extending upwardly from the inner circumference of the bottom wall 131a in such a manner as to further divide the rear section of the aforesaid inner space into a front part and a second part.

The body portion 131 has a front end, to which the center plate 18 is connected to cover the front opening 130a (see FIGS. 2 and 9), and a rear end, to which a rear plate 19 is connected to seal the rear opening 130b in a liquid tight manner (see FIG. 2).

Specifically, the transmission case 130 provides a front chamber 130F between the first intermediate wall 131c and the center plate 18, an intermediate chamber 130M between the first intermediate wall 131c and the second intermediate wall 131d, and a rear chamber 130R between the second intermediate wall 131d and the rear plate 19. An upper opening 130c is formed in an upper part of the body portion 131 (see FIG. 2), and sealed by a hydraulic lift case 20 (see FIG. 1).

The main-speed change unit 40 is accommodated in the front chamber 130F of the transmission case 130. Specifically, as best illustrated in FIG. 9, the main-speed change unit 40 includes a main-speed change shaft 401 connected to the propeller shaft 220 in such a manner as to be relatively non-rotatable around the axis, an intermediate shaft 402 located parallel to the main-speed change shaft 401, a sub-speed change shaft 403 located parallel to the intermediate shaft 402, main-speed change devices 410L, 410H for stepwisely changing the speed between the main-speed change shaft 401 and the intermediate shaft 402, a sub-speed change device 420 for stepwisely changing the speed between the intermediate shaft 402 and the sub-speed change shaft 403, a main-speed change operation device 430 for operating the main-speed change devices 410L, 410H, and a sub-speed change operation device 470 for operating the sub-speed change device 420.

The main-speed change shaft 401 has a front end supported by the center plate 18 and a rear end supported by the first intermediate wall 131c. The main-speed change shaft 401 has a front end extending forward through the center plate 18 to have a front extension connected to the rear end of the propeller shaft 220 in such a manner as to be relatively non-rotatable around the axis. The intermediate shaft 402 has front and rear ends respectively supported by the center plate 18 and the first intermediate wall 131c.

The sub-speed change shaft 403 has a front end supported by the center plate 18 and a rear end supported by the first intermediate wall 131c. The front end of the sub-speed change shaft 403 extends forward through the center plate 18 to have a front extension that forms a drive power output member for outputting drive power to a sub axle 240 (a front axle in this embodiment). The rear end of the sub-speed change shaft 403 extends rearward through the first intermediate wall 131c to have a rear extension operatively connected to the differential gear unit 50.

In this embodiment, as the main-speed change devices, first and second synchromesh devices 410L, 410H, each enabling power transmission at two speed stages, are employed. As best illustrated in FIG. 9, the first synchromesh device 410L includes a main-clutch hub 411 relatively non-rotatable with respect to the main-speed change shaft 401, first-speed and second-speed drive gears 412a, 412b relatively rotatably supported on the main-speed change shaft 401 in such a manner to be positioned with the main-clutch hub 411 therebetween, a main sleeve 413L axially slidably mounted on the main-clutch hub 411, and first-speed and second-speed driven gears 414a, 414b relatively non-rotatably mounted on the intermediate shaft 402 and held respectively in meshed engagement with the first-speed and second-speed drive gears 412a, 412b.

The main sleeve 413L is designed to be capable of taking a first-speed position enabling the main-clutch hub 411 and the first-speed drive gear 412a to be relatively non-rotatably connected to each other, a second-speed position enabling the main-clutch hub 411 and the second-speed drive gear 412b to be relatively non-rotatably connected to each other, and a neutral position enabling the main-clutch hub 411 to be disconnected from the first-speed and second-speed drive gears 412a, 412b on the basis of the operation from the outside via the main-speed change operation device 430. The thus arranged first synchromesh device 410L is designed to be capable of rotating the intermediate shaft 402 at rotational speeds respectively corresponding to the first speed stage and the second speed stage by positioning the main sleeve 413L at a first-speed position and a second speed-position.

The second synchromesh device 410H has the same arrangement as that of the first synchromesh device 410L except for gear ratios of the drive gears and driven gears. Accordingly, corresponding or identical parts to those of the first synchromesh device 410L have been given the same reference numerals with different letters attached thereto to omit a detailed description thereof.

In this embodiment, as the sub-speed change device, a mesh device 420 that enables power transmission at three speed stages is employed. Specifically, as best illustrated in FIG. 9, the mesh device 420 includes a low-speed drive gear 421L, a medium-speed drive gear 421M and a high-speed drive gear 421H relatively non-rotatably supported on the intermediate shaft 402, a low-speed driven gear 422L, a medium-speed driven gear 422M and a high-speed driven gear 422H relatively rotatably supported on the sub-speed change shaft 403 and held respectively in meshed engagement with the low-speed drive gear 421L, the medium-speed drive gear 421M and the high-speed drive gear 421H, a first sub-clutch hub 423 located between the low-speed driven gear 422L and the medium-speed driven gear 422M and relatively non-rotatably supported on the sub-speed change shaft 403, a first sub-sleeve 424 being capable of taking a low-speed position enabling the low-speed driven gear 422L to be connected to the first sub-clutch hub 423, a medium-speed position enabling the medium-speed driven gear 422M to be connected to the first sub-clutch hub 423 and a neutral position enabling the low-speed driven gear 422L and the medium-speed driven gear 422M to be disconnected from the first sub-clutch hub 423, a second sub-clutch hub 425 relatively non-rotatably supported on the sub-speed change shaft 403 at a position adjacent to the high-speed driven gear 422H, and a second sub-sleeve 426 being capable of taking a high-speed position enabling the high-speed driven gear 422H to be connected to the second sub-clutch hub 425 and a neutral position enabling the high-speed driven gear 422H to be disconnected from the second sub-clutch hub 425.

According to the thus arranged mesh device 420, the first or second sub-sleeve 424, 426 is shifted so as to enable the low-speed, medium-speed or high-speed driven gear 422L, 422M, 422H to be selectively connected to the first or second sub-clutch hub 423, 425, so that the sub-speed change shaft 403 can be rotated at low speed, medium speed or high speed.

Figure 11:
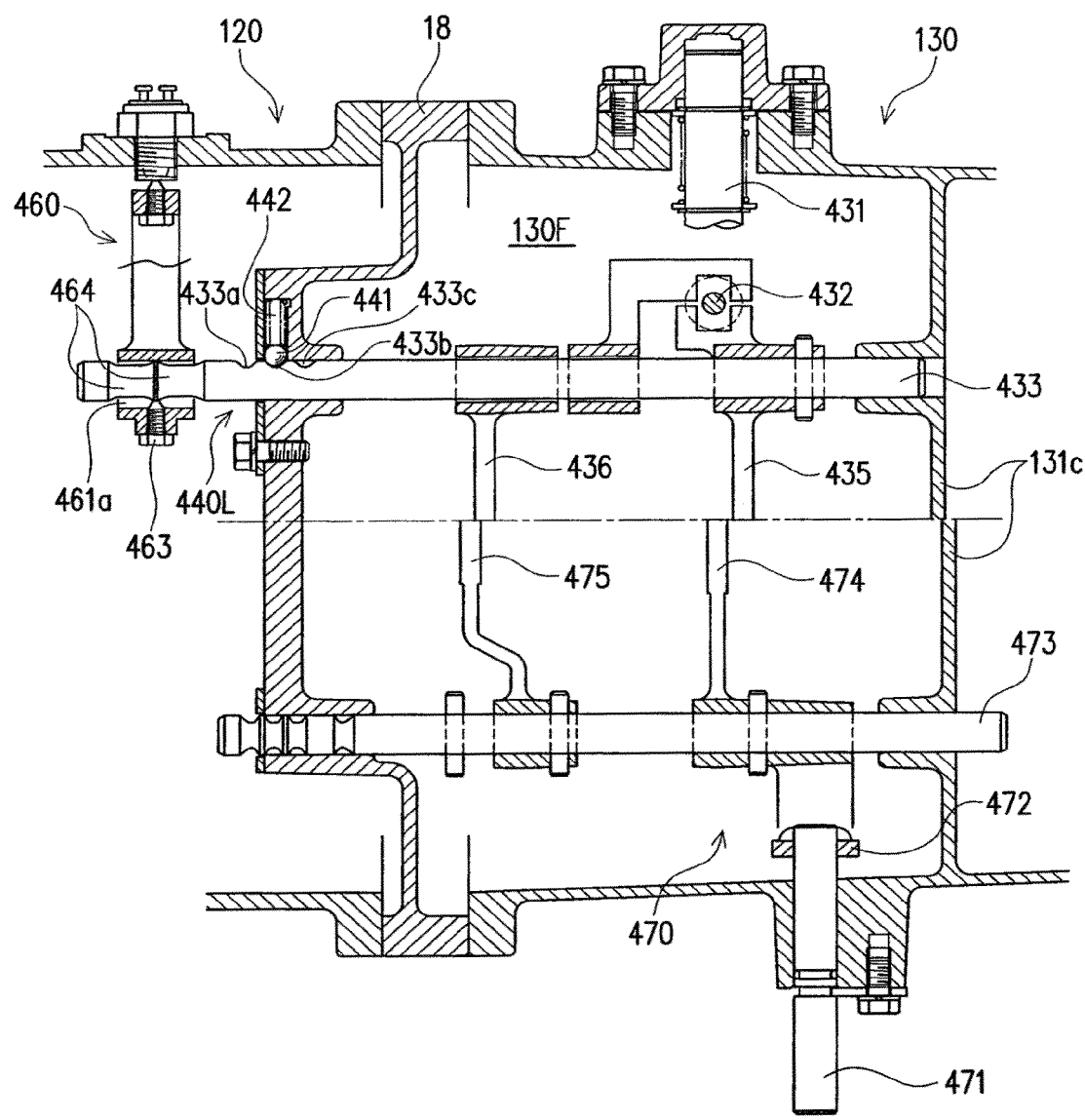
FIG. 11 is a cross sectional view taken along a line XI-XI in FIG. 10.
Figure 12:
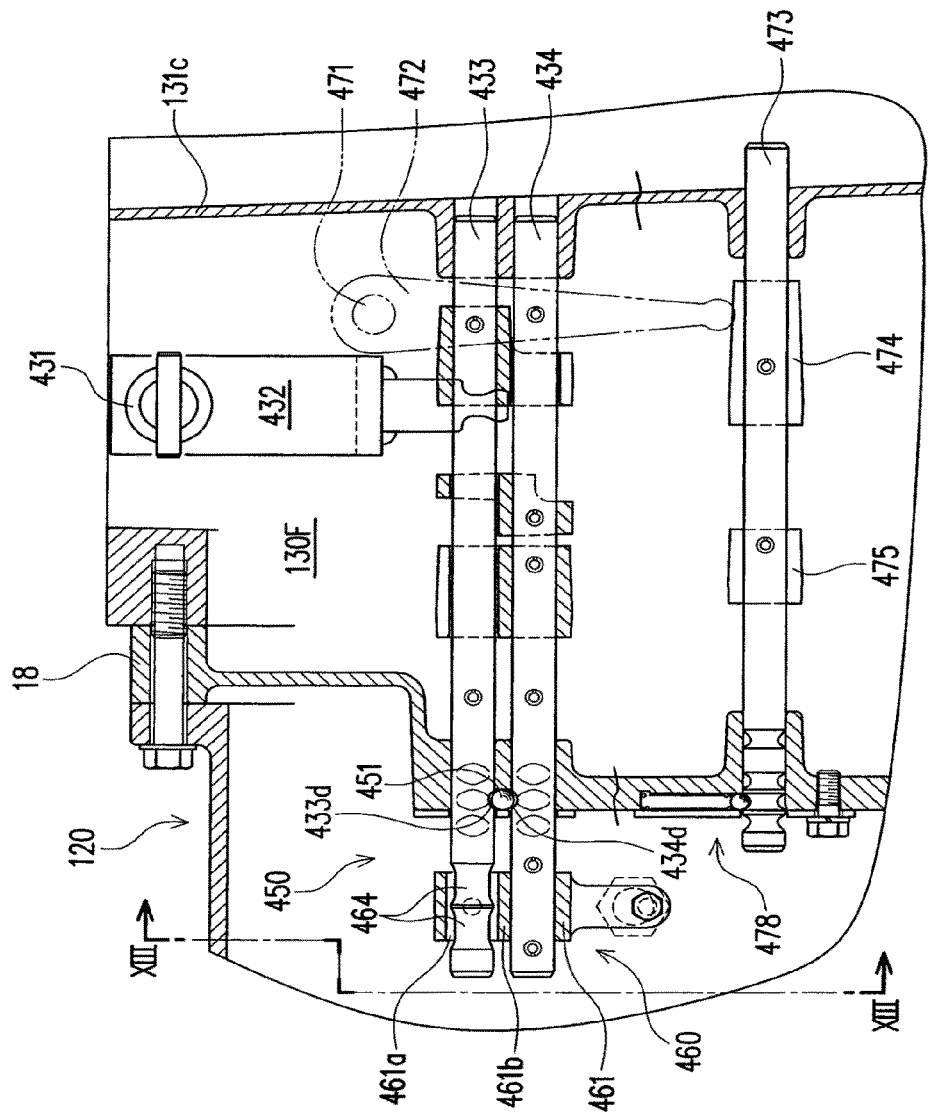
FIG. 12 is a cross sectional view taken along a line XII-XII in FIG. 10.

FIGS. 11 and 12 are cross sectional views respectively taken along a line XI-XI and a line XII-XII in FIG. 10.

As illustrated in FIGS. 9 to 12, the main-speed change operation device 430 includes a main-speed change operation shaft 431 that is supported by the pair of lateral walls 131b of the transmission case 130 in such a manner as to be axially rotatable and axially movable and extends in the vehicle width direction within the front chamber 130F of the transmission case 130, a main-speed change operation arm 432 that has a proximal end relatively non-rotatably and axially immovably supported on the main-speed change operation shaft 431 and is located within the front chamber 130F, first and second main-fork shafts 433, 434 that are axially slidably supported by the center plate 18 and the first intermediate wall 131c and extend along the vehicle longitudinal axis within the front chamber 130F, a first main-fork 435 that is axially non-slidably supported on the first main-fork shaft 433 and has a proximal end being selectively engaged with the main-speed change operation arm 432 and a free end being engaged with the main sleeve 413L, and a second main-fork 436 that is axially non-slidably supported on the second main-fork shaft 434 and has a proximal end being selectively engaged with the main-speed change operation arm 432 and a free end being engaged with the main sleeve 413H.

As illustrated in FIG. 10, at least one end of the main-speed change operation shaft 431 extends outward from the transmission case 130 to have an outer extension connected via a proper link mechanism to a main-speed change operation member 2 (see FIG. 1) such as a main-speed change lever equipped near a driver seat. That is, the main-speed change operation shaft 431 is moved in the axial direction and rotated around the axis on the basis of operation by the main-speed change operation member 2. On the opposite sides of the main-speed change operation shaft 431 are respectively provided neutral position return springs that together act to automatically return the main-speed change operation shaft 431 to a neutral position at the center in the axial direction, when a force applied from the outside to the main-speed change operation shaft 431 has been released.

The main-speed change operation arm 432 is designed to be selectively engaged with the first and second main-forks 435, 436 according to the axial position of the main-speed change operation shaft 431. That is, the main-speed change operation arm 432 is engaged with the first main-fork 435 by moving the main-speed change operation shaft 431 to a first side along the axis (a right side in FIG. 10), and engaged with the second fork 436 by moving the main-speed change operation shaft 431 to a second side along the axis (a left side in FIG. 10).

The thus arranged main-speed change operation device 430 is operated in the manner as described below.

The main-speed change operation arm 432 is engaged with any one of the first and second main-forks 435, 436 by moving the main-speed change operation shaft 431 from the neutral position to the first side along the axis. Then, the main-speed change operation shaft 431 held in this state is rotated around the axis towards a first direction. This rotation causes the main-speed change operation arm 432 to be pivotally moved around the axis to the first direction, thereby causing the main fork held in engagement with the main-speed change operation arm 432 to be pressed and moved along the axis together with the fork shaft. Accordingly, only the main sleeve that is engaged with the main fork, is pressed and moved to an engaging position on a corresponding side.

That is, the first main-fork shaft 433 is capable of taking a first-speed position, a neutral position and a second-speed position with respect to the axial direction. Accordingly, when the first main-fork shaft 433 is positioned at the first-speed position, the neutral position and the second-speed position, the main sleeve 413L can correspondingly take the first-speed position, the neutral position and the second-speed position.

Likewise, the second main-fork shaft 434 can take a third-speed position, a neutral position and a fourth-speed position with respect to the axial direction. Accordingly, when the second main-fork shaft 434 is positioned at the third-speed position, the neutral position and the fourth-speed position, the main sleeve 413H can correspondingly take the third-speed position, the neutral position and the fourth-speed position.

Preferably, as illustrated in FIGS. 11 and 12, first and second detent mechanisms 440L, 440H are provided to prevent unintentional axial motions of the first and second main-fork shafts 433, 434.

Specifically, as illustrated in FIG. 11, the first detent mechanism 440L is made up of the combination of a ball 441 being movable in the radial direction of a bearing hole for the first main-fork shaft 433 formed in the center plate 18, a spring 442 for urging the ball 441 towards the radially inner side of the bearing hole, as well as a first-speed recess 433a, a neutral recess 433b and a second-speed recess 433c formed on the outer circumference of the first main-fork shaft 433 along the axis, into which the ball 441 is engaged. The first-speed recess 433a, the neutral recess 433b and the second-speed recess 433c are located so that the ball 441 is correspondingly engageable into them when the first main-fork shaft 433 is positioned at the first-speed position, the neutral position and the second-speed position.

The second detent mechanism 440H has the same arrangement as that of the first detent mechanism 440L. Accordingly, the description of the second detent mechanism will be omitted. The thus provided first and second detent mechanisms 440L, 440H prevent unintentional motions of the first and second main-fork shafts 433, 434 along the axis, thereby effectively preventing malfunction which may result in such as simultaneous engagement of the first and second synchromesh devices 410L, 410H.

More preferably, a simultaneous-motion prevention mechanism 450 is provided to prevent simultaneous motion of the first and second main-fork shafts 433, 434 along the axis. Specifically, as illustrated in FIG. 12, the simultaneous-motion prevention mechanism 450 is made up of the combination of a ball that is disposed to have portions protruding into bearing holes for respectively bearing-supporting the first and second main-fork shafts, and first and second recesses 433d, 434d respectively formed on the outer circumferences of the first and second main-fork shafts 433, 434. The first and second recesses 433d, 434d are located so that the ball 451 is engageable into a corresponding one of them when the first and second main-fork shafts 433, 434 each are positioned at the neutral position. The thus provided simultaneous-motion prevention mechanism 450 can prevent simultaneous motion of the first and second main-fork shafts 433, 434, and hence effectively prevent the first and second synchromesh devices 410L, 410H from simultaneously coming into engaging state.

Figure 13:
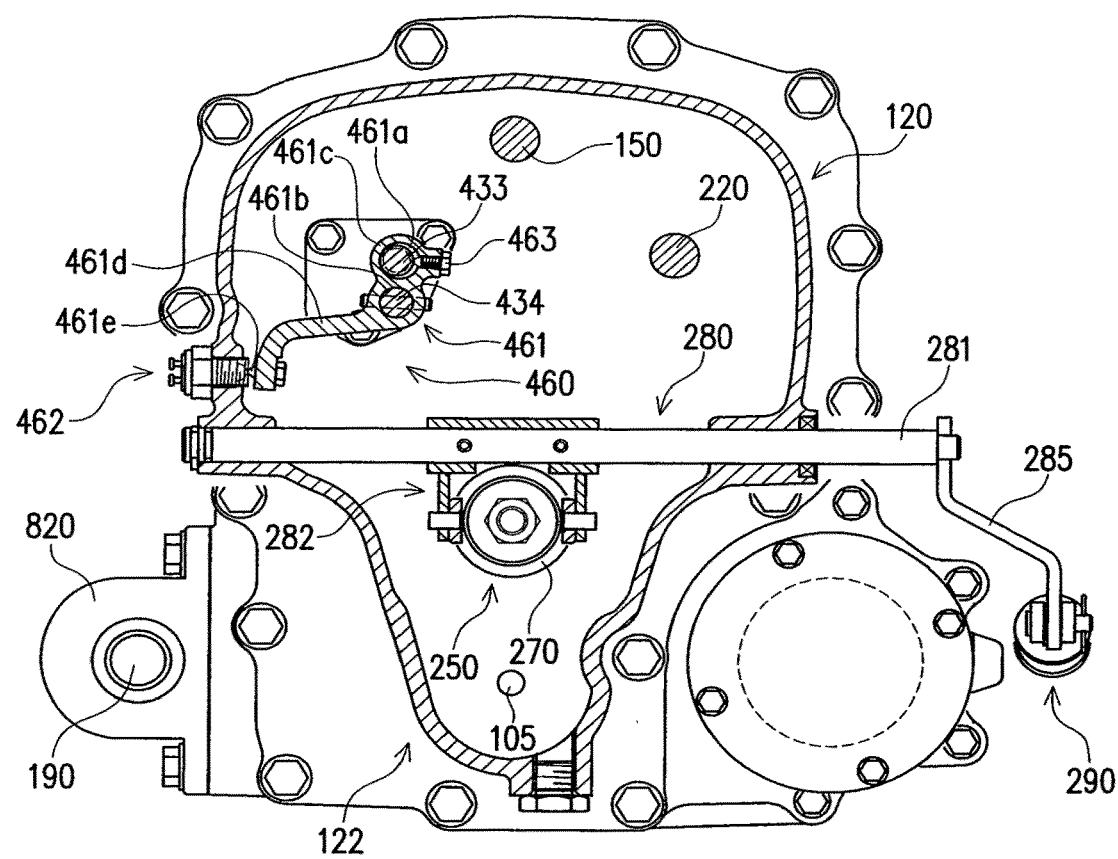
FIG. 13 is a cross sectional view taken along a line XIII-XIII in FIG. 12.

More preferably, an engine-start switch mechanism 460 is provided to prevent start of the engine when the main-speed change devices 410 (the first and second synchromesh devices 410L, 410H in this embodiment) are held in the engaging state. FIG. 13 is a cross sectional view taken along a line XIII-XIII in FIG. 12.

As illustrated in FIGS. 10 to 13, the engine-start switch mechanism 460 includes a detection target 461 mounted on both front extensions of the first and second main-fork shafts 433, 434, a detection member 462 adapted to be held in contact and non-contact with the detection target 461 according to the position or posture of the detection target 461, and a control mechanism 463 for controlling the position or posture of the detection target 461 according to the axial position of the first and second main-fork shafts 433, 434.

As best illustrated in FIG. 12, the detection target 461 is arranged to be axially slidable relative to the first main-fork shaft 433 and radially slidable within a predetermined range relative to the same, and axially immovable and movable in the circumferential direction relative to the second main-fork shaft 434. Specifically, the detection target 461 has a proximal end 461c having first and second through-holes 461a, 461b, through which the front extensions of the first and second main-fork shafts 433, 434 respectively pass, an arm 461d extending from the proximal end 461c towards the detection target 462, and a detection target portion 461e provided on the arm 461d.

The first through-hole 461a has a diameter larger than the front extension of the first main-fork shaft 433. On the other hand, the second through-hole 461b has a diameter substantially equal to the front extension of the second main-fork shaft 434. With this arrangement, the detection target 461 is pivotally movable around the second main-fork shaft 434 within a predetermined range.

The control mechanism 463 is capable of preventing the detection target 461 from being pivotally moved around the second main-fork shaft 434 when the first main-fork shaft 433 lies at the neutral position, and allowing the detection target 461 to be pivotally moved around the second main-fork shaft 434 when the first main-fork shaft 433 lies at the first-speed position or second-speed position.

Specifically, the control mechanism 463 has an inner end protruding into the first through-hole 461a and an outer end extending outward of the detection target 461, so that the radial position of the inner end thereof is adjustable. Of the outer circumference of the first main-fork shaft 433, portions that face the inner end of the control mechanism 463 at the time, at which the first main-fork shaft 433 lies at the first-speed position and the second-speed position, respectively have recessed portions 464. That is, of the first main-fork shaft 433, the portions that face the inner end of the control mechanism 463 at the time, at which the first main-fork shaft 433 lies at the first-speed position and the second-speed position, respectively have diameters smaller than a portion that faces the inner end of the control mechanism 463 at the time, at which the first main-fork shaft 433 lies at the neutral position.

The detection member 462 is located so as to lie at the same position with respect to the axial direction of the second main-fork shaft 434 as the detection target portion 461e when the second main-fork shaft 434 lies at the neutral position. In this embodiment, the detection member 462 is located to have an inner end protruding into the inside of the intermediate housing 120 and an outer end extending outward of the intermediate housing 120.

The thus arranged engine-start switch mechanism 460 produces an effect as described below.

That is, when the first main-fork shaft 433 lies at the neutral position, the inner end of the control mechanism 463 faces a region other than the recessed portions 464. In this state, the axial position of the control mechanism 463 is set to have the inner end of the control mechanism 463 abutting against the outer circumference of the first main-fork shaft 433. Whereby, the position or posture of the detection target 461 can be kept.

When the first main-fork shaft 433 has been moved from the above position to the first-speed position or the second-speed position, the inner end of the control mechanism 463 faces the recessed portions 464. Accordingly, there causes a clearance between the inner end of the control mechanism 463 and the first main-fork shaft 433. Whereby, the detection target 461 is pivotally moved around the second main-fork shaft 434 by an amount corresponding to the clearance. Accordingly, by forming the respective members and parts with such a size and dimension as to enable the detection member 462 to abut the detection target 461 only at the time at which the detection target 461 is held at a position as illustrated in FIG. 13, detection of the first main-fork shaft 433 lying at the neutral position can be securely made.

As described above, the detection target portion 461e is adapted to be matched in position to the detection member 462 when the second main-fork shaft 434 lies at the neutral position. That is, when the second main-fork shaft 434 lies at the third-speed position or the fourth-speed position, the detection target portion 461e does not abut the detection member 462.

Thus, the engine-start switch mechanism 460 can securely detect the first and second main-fork shafts 433, 434 whether they both lie at the neutral position, thereby effectively preventing the engine from being started when the first and second synchromesh devices 410L, 410H are held in the engaging state.

Now, the description will be made for the sub-speed change operation device 470. As illustrated in FIGS. 10-12, the sub-speed change operation device 470 includes a sub-speed change operation shaft 471 axially rotatably supported by the pair of lateral walls 131b of the transmission case 130 so as to extend in the vehicle width direction within the front chamber 130F of the transmission case 130, a sub-speed change operation arm 472 having a proximal end relatively non-rotatably supported on the sub-speed change operation shaft 471 so as to be located within the front chamber 130F, a sub-fork shaft 473 axially slidably supported by the center plate 18 and the first intermediate wall 131c so as to extend along the vehicle longitudinal axis within the front chamber 130F, first and second sub-forks 474, 475 axially non-slidably supported on the sub-fork shaft 473, in which any one of the proximal ends of the first and second sub-forks 474, 475 is connected to a free end of the sub-speed change operation arm 472 (in this embodiment, the proximal end of the first sub-fork 474 is connected to the free end of the sub-speed change operation arm 472), and free ends of the first and second sub-forks 474, 475 are respectively engaged with the first and second sub-sleeves 424, 426, and a sub-speed change connection arm 476 for operation of the sub-speed change control shaft 471 from the outside (see FIG. 1).

The thus arranged sub-speed change operation device 470 is capable of bringing the sub-speed change device 420 into a low-speed state, a neutral state, a medium-speed state and a high-speed state by rotating the sub-speed change operation shaft 471 around the axis, on the basis of operation from the outside by a sub-speed change operation member 3 such as a sub-speed change lever disposed around the driver seat. In the same manner as the first and second main-fork shafts 433, 434, the sub-fork shaft 473 may be provided with a detent mechanism 478 (see FIG. 12).

Figure 14:
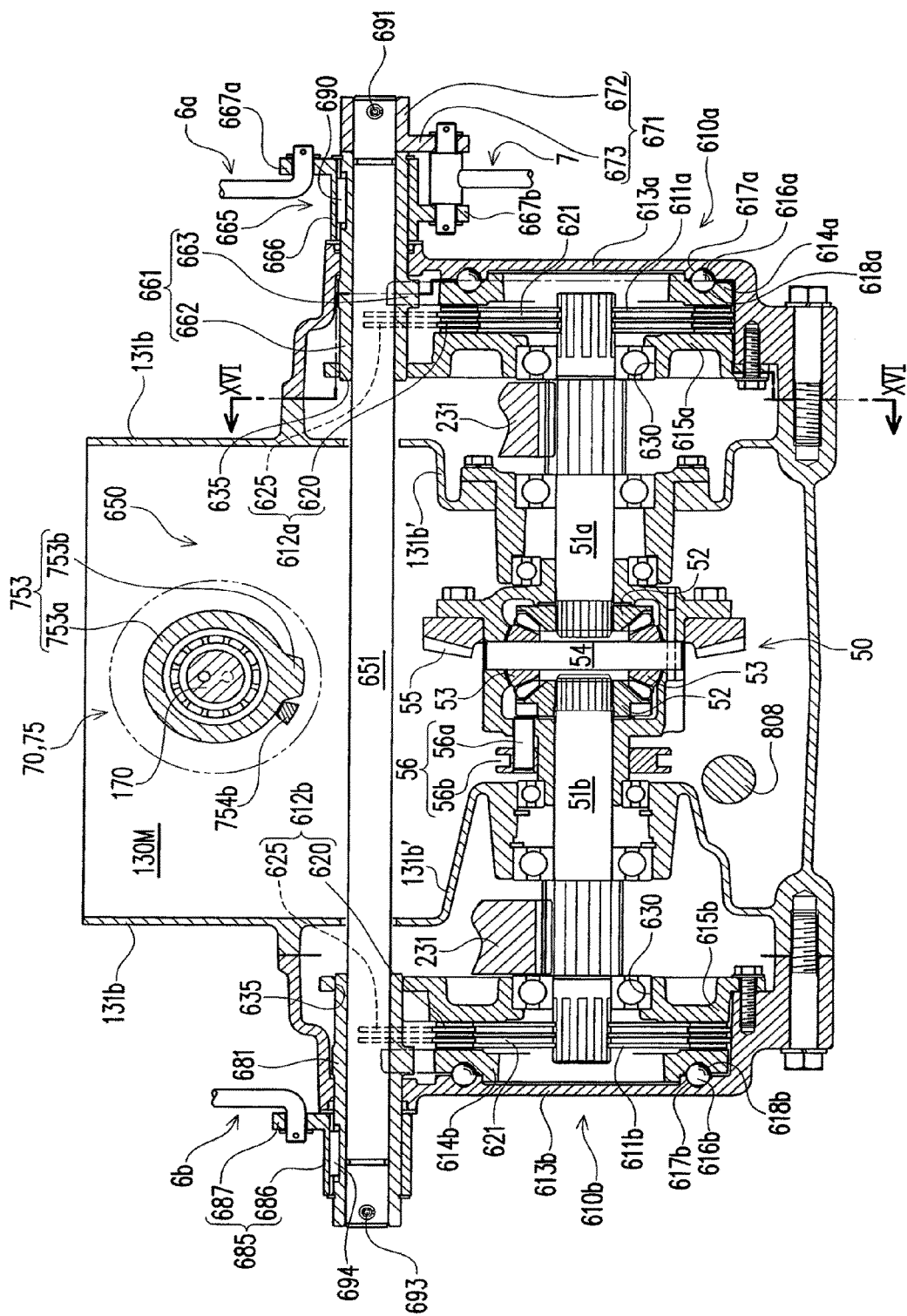
FIG. 14 is a cross sectional view taken along a line XIV-XIV in FIG. 2.
Figure 15:
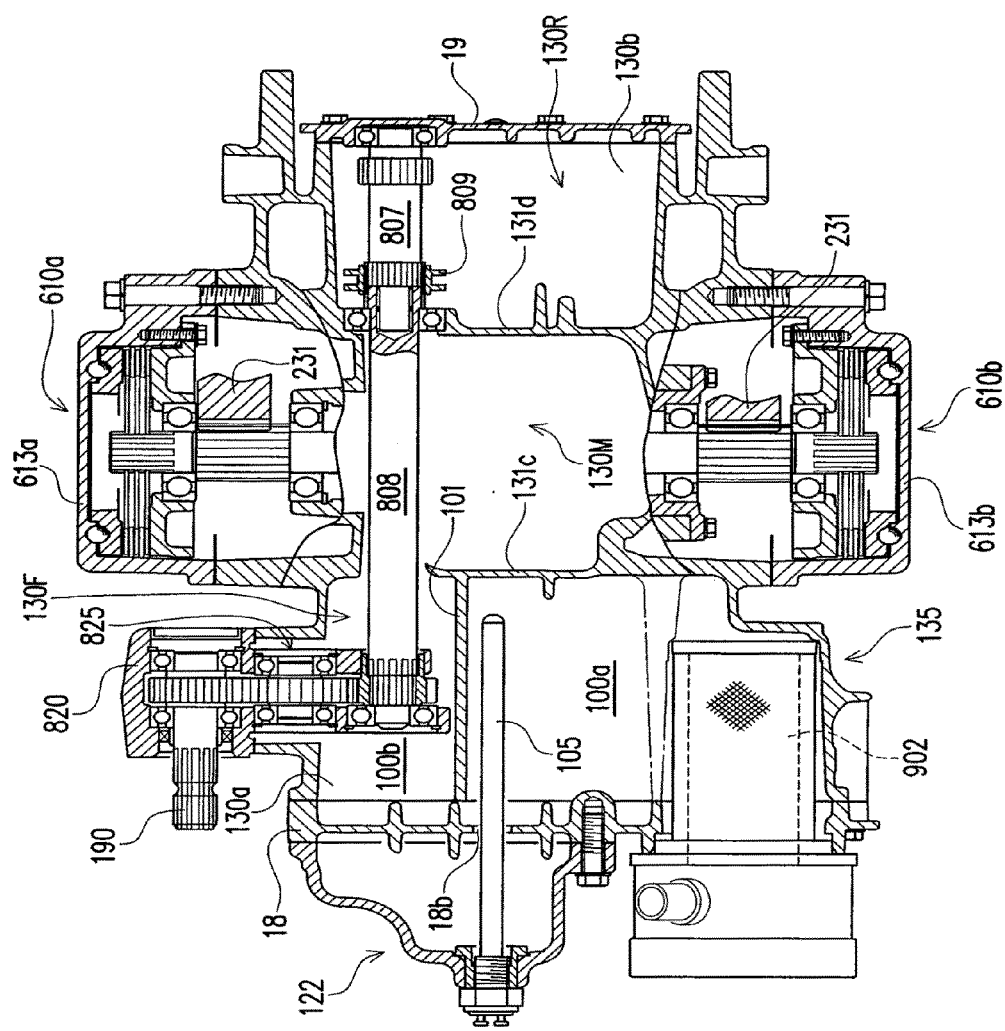
FIG. 15 is a development plan view of the transmission case in lateral cross section.
Figure 16:
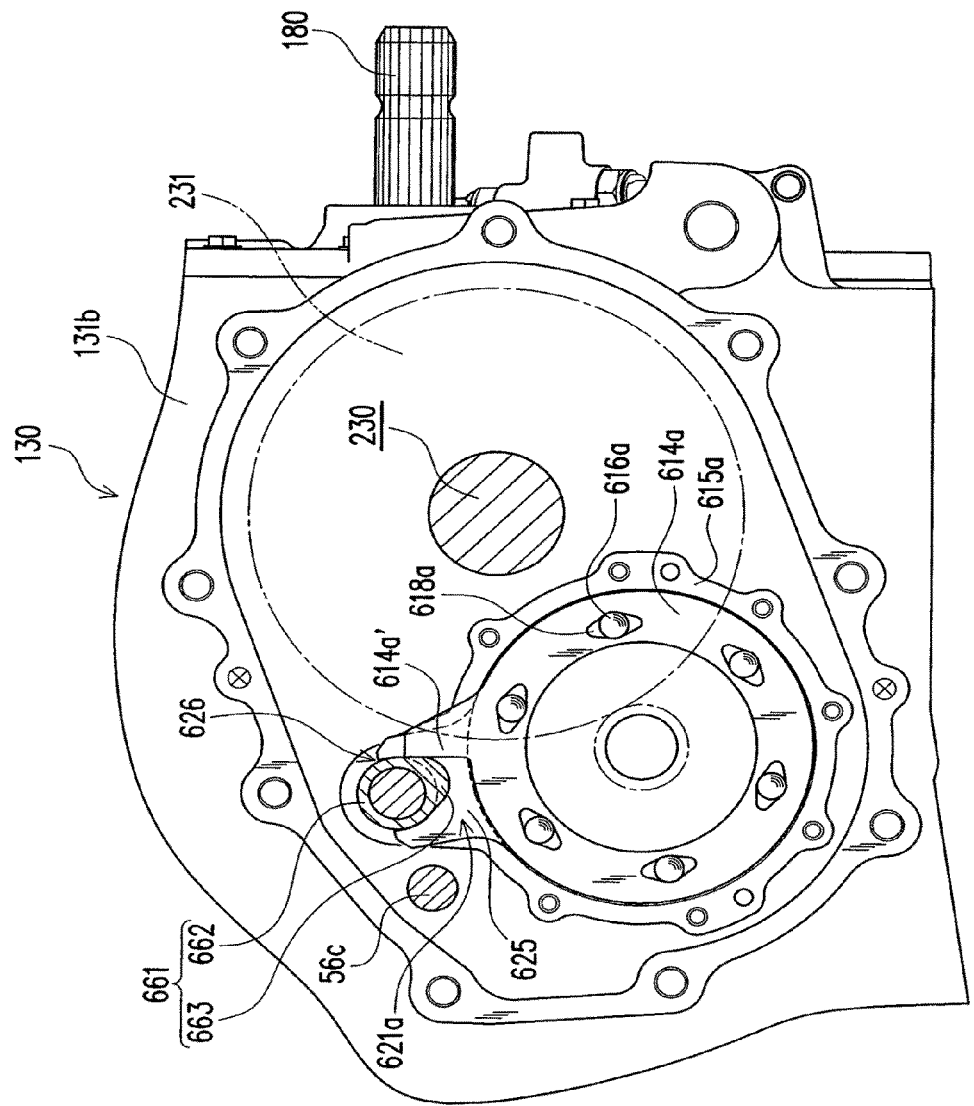
FIG. 16 is a cross sectional view taken along a line XVI-XVI in FIG. 14.

FIG. 14 is a cross sectional view taken along a line XIV-XIV in FIG. 2. FIG. 15 is a development plan view of the transmission case in lateral cross section. FIG. 16 is a cross sectional view taken along a line XVI-XVI in FIG. 14. As illustrated in FIG. 2, the differential gear unit 50 is accommodated in the intermediate chamber 130M of the transmission case 130. Specifically, as illustrated in FIG. 14, of the lateral walls 131b of the transmission case 130, lower portions (hereinafter referred as lower lateral walls 131b') are bent towards a lateral center of the vehicle (a center of the vehicle with respect to the vehicle width direction, or simply referred to a vehicle lateral center). Thus, the differential gear unit 50 is located between the lower lateral walls 131b'.

More specifically, as best illustrated in FIG. 14, the differential gear unit 50 includes a pair of differential yoke shafts 51 supported by the lower lateral walls 131b' to respectively have inner ends located inward of the intermediate chamber 130M and outer ends located outward of the intermediate chamber 130M, a pair of side bevel gears 52 relatively non-rotatably supported on the inner ends of the pair of differential yoke shafts 51, a bevel gear 53 that is held in meshed engagement with the pair of side bevel gears and travels around the pair of differential yoke shafts 51 while being rotated around a pivotal shaft 54 orthogonal to the pair of differential yoke shafts 51, and a ring gear 55 connected to the pivot shaft 54 so as to keep the traveling of the bevel gear 53 while permitting the rotation of the same.

The differential gear unit 50 is capable of transmitting drive power, which has been input from the rear end of the sub-speed change shaft 403 to the ring gear 55, to the pair of differential yoke shafts 51 (see FIGS. 9 and 14). The pair of differential yoke shafts 51 are respectively and operatively connected to a pair of main-drive axles 230 (a pair of rear axles in this embodiment) supported on the pair of lateral walls of the transmission case via a transmission gear 231.

Preferably, the differential gear unit 50 may include a lock mechanism 56 that forcibly rotates the pair of differential yoke shafts 51 at the same speed while preventing the rotation of the bevel gear 53. As illustrated in FIG. 14, the lock mechanism 56 includes a lock pin 56a capable of taking a lock position enabling the ring gear 55 and the pair of side bevel gears 52 to be relatively non-rotatably connected to each other and an operable position enabling them to be rotatable relative to each other at different speeds, a sleeve 56b for controlling the lock pin 56a, a differential lock fork (not shown) for operating the sleeve 56b, a differential lock fork shaft 56c (see FIG. 16) for supporting the differential lock fork, and a differential lock arm 56d (see FIG. 1) for operating the differential lock fork shaft 56c from the outside.

The vehicle of this embodiment further includes a brake mechanism 60 placed in the running-power transmission mechanism. The brake mechanism 60 is designed to be capable of directly or indirectly, and independently or dependently applying braking power to the pair of main-drive axles 230, to which drive power is transmitted from the power source, according to the selected operation from the outside.

In this embodiment, the brake mechanism 60 is designed to be capable of independently or dependently applying brake power to the pair of first and second differential yoke shafts 51a, 51b in the differential gear unit 50 according to the selected operation from the outside. Specifically, the brake mechanism 60 includes first and second brake units 610a, 610b for applying brake power respectively to the first and second differential yoke shafts 51a, 51b, and a brake operation unit 650 for selectively actuating the first and second brake units 610a, 610b independently of each other or integrally to each other according to the operation from the outside.

The first brake unit 610a includes a first drive-side brake disk 611a axially movable and non-rotatable relative to the first differential yoke shaft 51a, a first fixed-side brake disk 612a axially movable relative to the first differential yoke shaft 51a, a first brake cover 613a connected to the transmission case 130 to cover the first drive-side brake disk 611a and the first fixed-side brake disk 612a, a first brake actuator 614a located between a first brake disk group, which is made up of the first drive-side brake disk 611a and the first fixed-side brake disk 612a, and an inner circumference of the first brake cover 613a so as to be rotatable around the first differential yoke shaft 51a, and a stop member 615a that is located opposite to the first brake actuator 614a with the first brake disk group therebetween and defines a limit of the axial motion of the first brake disk group pressed by the first brake actuator 614a.

The first fixed-side brake disk 612a is located opposite to the first drive-side brake disk 611a and capable of coming into frictional engagement with the first drive-side brake disk 611a according to the actuation of the first brake actuator 614a. That is, the first fixed-side brake disk 612a is not rotatable relative to the first differential yoke shaft 51a, while being axially movable thereto. The description will be later made for the structure that makes the first fixed-side brake disk 612a non-rotatable.

The first brake actuator 614a is adapted to press the first brake disk group so as to bring the first drive-side brake disk 611a and the first fixed-side brake disk 612a into frictional engagement with each other according to the rotational motion of its own. Specifically, the first brake unit 610a has cam balls 616a interposed between the first brake actuator 614a and the first brake cover 613a.

The cam balls 616a are engaged into holding recesses 617a formed on one of the adjacent surfaces of the first brake actuator 614a and the first brake cover 613a (an inwardly facing surface of the first brake cover 613a in this embodiment). Another one of the adjacent surfaces (the outwardly facing surface of the first brake actuator 614a in this embodiment) of the first brake actuator 614a and the first brake cover 616a has tapered grooves 618a into which the cam balls 616a are engaged. The tapered grooves 618a each have a deepest portion and a tapered portion that gradually decreases in depth as it advances from the deepest portion in the circumferential direction of the first differential yoke shaft 51a.

With the above arrangement, by the rotation of the first brake actuator 614a, it is moved inwardly in the axial direction of the first differential yoke shaft 51a via the cam balls 616a so as to press the first brake disk group. The description will be later made for the structure that rotates the first brake actuator 614a.

The stop member 615a is a plate-like member having a center hole through which the first differential yoke shaft 51a is bearing-supported. The stop member 615a is connected to any one of the transmission case 130 and the first brake cover 613a (the first brake cover 613a in this embodiment).

The second brake unit 610b has substantially the same arrangement as that of the first brake unit 610a. Accordingly, the detailed description thereof will be omitted. In Figures, "b" is suffixed in place of "a" to each of the reference codes of the identical or corresponding parts in the first brake unit 610a.

The brake operation unit 650 includes a brake operation shaft 651 located substantially parallel to the first and second differential yoke shafts 51a, 51b, a first actuation member 661 relatively rotatably mounted on a portion of the brake operation shaft 651 closer to a first side, which portion facing the first brake unit 610a, a first brake connection member 665 relatively non-rotatably supported on the first actuation member 661, a common brake connection member 671 relatively non-rotatably supported on the brake operation shaft 651, a second actuation member 681 relatively non-rotatably mounted on a portion of the brake operation shaft 651 closer to a second side, which portion facing the second brake unit 610b, and a second brake connection member 685 relatively non-rotatably supported on the second actuation member 681.

The brake operation shaft 651 has opposite ends extending outward so as to enable the first brake connection member 665, the common brake connection member 671 and the second brake connection member 685 to be operated from the outside. In this embodiment, the brake operation shaft 651 is supported by the first and second brake covers 613a, 613b to have opposite outer extensions, while the first brake connection member 665, the common brake connection member 671 and the second brake connection member 685 are located on the opposite outer extensions.

Figure 17:
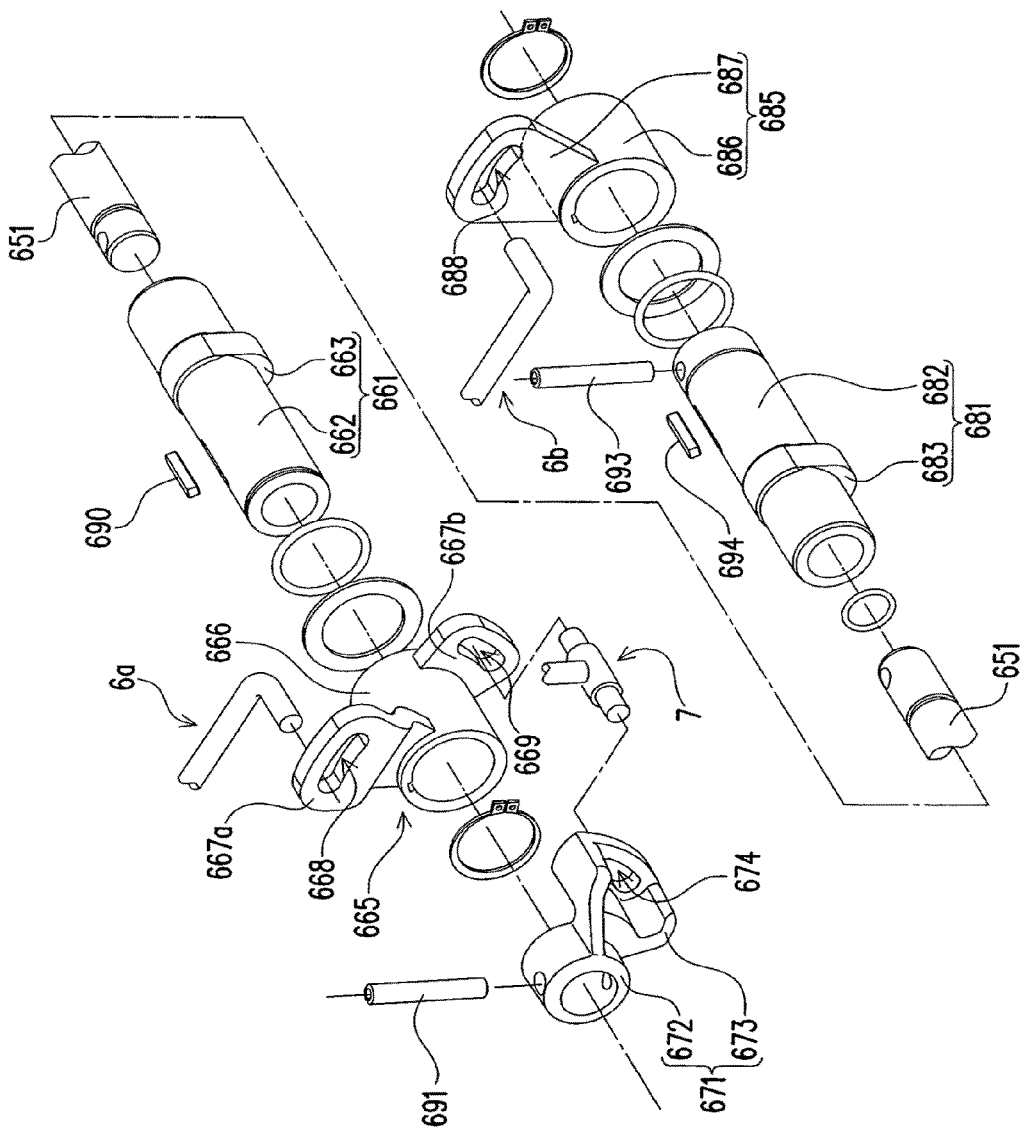
FIG. 17 is a perspective partially-exploded view of a brake mechanism in the vehicle of FIG. 1, in which parts supported on a brake operation shaft in the brake mechanism are shown.

FIG. 17 is a perspective partially-exploded view of those constitutional members supported on the brake operation shaft 651. As illustrated in FIGS. 14, 16 and 17, the first actuation member 661 is operatively connected to the corresponding first brake actuator 614*a*. That is, when the first actuation member 661 is rotated around the axis of the brake operation shaft 651, the first brake actuator 614*a* is rotated around the axis of the first differential yoke shaft 51*a*.

In this embodiment, the first actuation member 661 has a tubular portion 662 mounted on the brake operation shaft 651 and a cam portion 663 radially outwardly extending from the tubular portion 662 (see FIG. 16). The first brake actuator 614*a* has a cam follower portion 614*a*' that is engaged with the cam portion 663 of the first actuation member 661. With this arrangement, when the first actuation member 661 is rotated around the axis of the brake operation shaft 651, the first brake actuator 614*a* is rotated around the first differential yoke shaft 51*a*. Whereby, the first brake actuator 614*a* is pressed towards the inner side of the first differential yoke shaft 51*a* along the axis.

The first brake connection member 665 allows the first actuation member 661 to be rotated around the axis of the brake operation shaft 651 on the basis of the operation of any one of a first brake operation member 4*a* and a common brake operation member 5 by the driver.

That is, as illustrated in FIG. 1, provided near the driver seat are the first brake operation member 4*a* such as a brake pedal for the sole operation of the first brake unit 610*a* and the common brake operation member 5 such as a parking lever for the simultaneous and integral operation of the first and second brake units 610*a*, 610*b*. The first brake connection member 665 is connected to the first brake operation member 4*a* and the common brake operation member 5 via suitable like mechanisms, namely a first link mechanism 6*a* and a common link mechanism 7. That is, the first brake connection member 665 is capable of being rotated around the axis of the brake operation shaft 651 on the basis of the operation of any one of the first brake operation member 4*a* and the common brake operation member 5.

Specifically, as illustrated in FIGS. 14 and 17, the first brake connection member 665 has a tubular body 666 relatively non-rotatably mounted on the first actuation member 661 and a connection portion 667 radially outwardly extending from the tubular body 666. In this embodiment, the first brake connection member 665 is relatively non-rotatably mounted on the first operation member 661 via a keyway 690. The connection portion 667 has a first brake groove 668 into which a portion of the first link mechanism 6*a* is engaged and a common brake groove 669 into which a portion of the common link mechanism 7 is engaged. The first brake groove 668 and the common brake groove 669 are displaced from each other in the circumferential direction with the axis of the brake operation shaft 651 as a reference.

In this embodiment, the first brake connection member 665 has two radially outwardly extending connection portions 667*a*, 667*b* that are displaced from each other in the circumferential direction of the tubular body 666. The first brake groove 668 and the common brake groove 669 are respectively formed in these two connection portions 667*a*, 667*b*.

The common brake connection member 671 is capable of rotating the brake operation shaft 651 around the axis on the basis of the operation of the common brake operation member 5 by the driver. That is, the common brake connection member 671 is connected to the common brake operation member 5 via the common link mechanism 7, so that the brake operation shaft 651 is rotated around the axis on the basis of the common brake operation member 5.

Specifically, the common brake connection member 671 has a tubular body 672 relatively non-rotatably mounted on the brake operation shaft 651 and a connection portion 673 radially outwardly extending from the tubular body 672. In this embodiment, the tubular body 672 is relatively non-rotatably mounted on the brake operation shaft 651 via a pin 691. The connection portion 673 has a common brake groove 674 into which a portion of the common link mechanism 7 is engaged.

That is, as best illustrated in FIG. 17, the portions of the common link mechanism 7 are engaged into both the common brake grooves 669, 674 respectively formed in the first brake connection member 665 and the common brake connection member 671. Accordingly, upon the operation of the common brake operation member 5, the first brake connection member 665 is rotated, which rotation causes the rotation of the first actuation member 661 and the rotation of the common brake connection member 671, which rotation in turn causes the rotation of the brake operation shaft 651.

Preferably, as illustrated in FIG. 17, the common brake grooves 669, 674 of the first brake connection member 665 and the common brake connection member 671 are formed in the same position with respect to the circumferential direction with the axis of the brake operation shaft 651 as a reference. With the above arrangement, it is possible to easily rotate both the first brake connection member 665 and the common brake connection member 671 by the common link mechanism 7.

More preferably, the first brake groove 668 in the first brake connection member 665 is displaced from the common brake grooves 669, 674 in the circumferential direction with the axis of the brake operation shaft 651 as a reference (see FIG. 17). With this arrangement, it is possible to easily achieve the rotation of only the first brake connection member 665 by the first link mechanism 6*a*, and the rotation of both the first brake connection member 665 and the common brake connection member 671 by the common link mechanism 7.

The second actuation member 681 has a tubular portion 682 relatively non-rotatably supported on the brake operation shaft 651 and a cam portion 683 radially outwardly extending from the tubular portion 682 (see FIG. 17). In this embodiment, the tubular part 682 is relatively non-rotatably mounted on the brake operation shaft 651 via a pin 693. The second actuation member 681 is operatively connected to the corresponding second brake actuator 614*b* via the cam portion 683.

The second brake connection member 685 is capable of rotating the second actuation member 681 relatively non-rotatably supported on the brake operation shaft 651 on the basis of the operation of a second brake operation member 4*b* (see FIG. 1) by the driver. Specifically, as best illustrated in FIG. 1, the second brake operation member 4*b* such as a brake pedal for the sole operation of the second brake unit 610*b* is provided near the driver seat. The second brake connection member 685 is connected to the second brake operation member 4*b* via a second link mechanism 6*b*. Accordingly, upon the operation of the second brake operation member 4*b*, the second brake connection member 685 is rotated, which rotation causes the rotation of the second actuation member 681 and the brake operation shaft 651 around the axis.

More specifically, the second brake connection member 685 has a tubular body 686 relatively non-rotatably mounted on the second actuation member 681 and a connection portion 687 radially outwardly extending from the tubular body 686. In this embodiment, the tubular body 686 is relatively non-rotatably mounted on the second operation member 681 via a keyway 694. The connection portion 687 has a second brake groove 688 into which a portion of the second link mechanism 6*b* is engaged.

Thus, in the brake mechanism of this embodiment, the connections of the first brake connection member 665, the common brake connection member 671 and the second brake connection member 685 with respect to the first link mechanism 6a, the common link mechanism 7 and the second link mechanism 6b are respectively achieved through the first brake groove 668, the common brake grooves 669, 674 and the second brake groove 688. Accordingly, it is possible to achieve the individual or sole operation of each of the first brake unit and the second brake unit, as well as the integral operation of both the brake units without the necessity to provide a complicated switching mechanism. Preferably, the second brake groove 688 is formed in the same position as the first brake groove 668 with respect to the circumferential direction with the axis of the brake operation shaft 651 as a reference.

More specifically, the first brake groove 668, the common brake grooves 669, 674 and the second brake groove 688 extend throughout a predetermined length respectively in the rotational directions of the first brake connection member 665, the common brake connection member 671 and the second brake connection member 685. The first link mechanism 6a is engaged into a downstream end portion of the first brake groove 668 in the rotational direction of the first brake connection member 665, and the second link mechanism 6b is engaged into a downstream end portion of the second brake groove 688 in the rotational direction of the second brake connection member 685. Likewise, the common link mechanism 7 is engaged into a downstream end portion of the common brake groove 669 in the rotational direction of the first brake connection member 665 and a downstream end portion of the common brake groove 674 in the rotational direction of the common brake connection member 671.

The thus arranged brake mechanism is actuated in the manner as described below.

First, the description will be made for the case where the first link mechanism 6a is operated. Upon the operation of the first link mechanism 6a, the first brake connection member 665 is rotated. This rotation causes the rotation of the common brake connection member 671. Even in this rotational state, the common link mechanism 7 and the second link mechanism 6b are not influenced by these rotations. That is, as described above, the common brake groove 669 formed on the first brake connection member 665, into which the common link mechanism 7 is engaged, extends throughout a predetermined length in the rotational direction of the first brake connection member 665. Therefore, the rotation of the first brake connection member 665 does not cause the movement of the common link mechanism 7. The first brake connection member 665 is relatively rotatable with respect to the brake operation shaft 651. Therefore, the rotation of the first brake connection member 665 does not cause the rotation of the second brake connection member 685. Thus, by the operation of the first link mechanism 6a, it is possible to rotate the first brake connection member 665 with no influence over the common link mechanism 7 and the second link mechanism 6b.

Now, the description will be made for the case where the second link mechanism 6b is operated. Upon the operation of the second link mechanism 6b, the second brake connection member 685 is rotated. This rotation causes the rotations of the second operation member 681 and the brake operation shaft 651. Even in this rotational state, the common link mechanism 7 and the first link mechanism 6a are not influenced by these rotations. That is, the rotation of the brake operation shaft 651 causes the rotation of the common brake connection member 671. The common brake groove 674 formed on the common brake connection member 671, into which the common link mechanism 7 is engaged, extends throughout a predetermined length in the rotational direction of the common brake connection member 671, as described above. Therefore, the rotation of the common brake connection member 671 upon the operation of the second link mechanism 6b does not cause the movement of the common link mechanism 7. Also, the first brake connection member 665 is relatively rotatable with respect to the brake operation shaft 651. Therefore, the rotation of the second brake connection member 685 does not cause the rotation of the first brake connection member 665. Thus, by the operation of the second link mechanism 6b, it is possible to rotate the second brake connection member 685 with no influence over the common link mechanism 7 and the first link mechanism 6a.

Now, the description will be made for the case where the common link mechanism 7 is operated. Upon the operation of the common link mechanism 7, both the first brake connection member 665 and the common brake connection member 671 are rotated. Even in this rotational state, the first link mechanism 6a and the second link mechanism 6b are not influenced by these rotations. That is, the first brake groove 668 formed on the first brake connection member 665, into which the first link mechanism 6a is engaged, extends throughout a predetermined length in the rotational direction of the first brake connection member 665. Therefore, the rotation of the first brake connection member 665 does not cause the movement of the first link mechanism 6a.

Likewise, the second brake groove 688 formed on the second brake connection member 685, into which the second link mechanism 6b is engaged, extends throughout a predetermined length in the rotational direction of the second brake connection member 685. Therefore, the rotation of the second brake connection member 685 does not cause the movement of the second link mechanism 6b. Thus, by the operation of the common link mechanism 7, it is possible to rotate the first brake connection member 665 and the second brake connection member 685, which is operated in association with the common brake connection member 671, with no influence over the first link mechanism 6a and the second link mechanism 6b.

Thus, the first brake groove 668 and the common brake groove 669 formed on the first brake connection member 665 have a connection capability enabling the rotation of the first brake connection member 665 through any one of the first link mechanism 6a and the common link mechanism 7, as well as a lost-motion enabling connection structure that prevents the rotational motion of the first brake connection member 665 through one of the first link mechanism 6a and the common link mechanism 7 from affecting another one of the first link mechanism 6a and the common link mechanism 7.

Further, the common brake groove 674 formed on the common brake connection member 671 has a connection capability enabling the rotation of the common brake connection member 671 through the common link mechanism 7, as well as a lost-motion enabling connection structure that prevents the rotational motion of the brake operation shaft 651 caused by the rotation of the second brake connection member 685 through the second link mechanism 6b from affecting the common link mechanism 7.

Further, the second brake groove 688 formed on the second brake connection member 685 has a connection capability enabling the rotation of the second brake connection member 685 through the second link mechanism 6b, as well as a lost-motion enabling connection structure that prevents the rotational motion of the brake operation shaft 651 caused by the rotation of the common brake connection member 671 through the common link mechanism 7 from affecting the second link mechanism 6b.

It is to be noted that the lost-motion enabling connection structure is not necessarily limited to a specific structure as described above.

Figure 24:
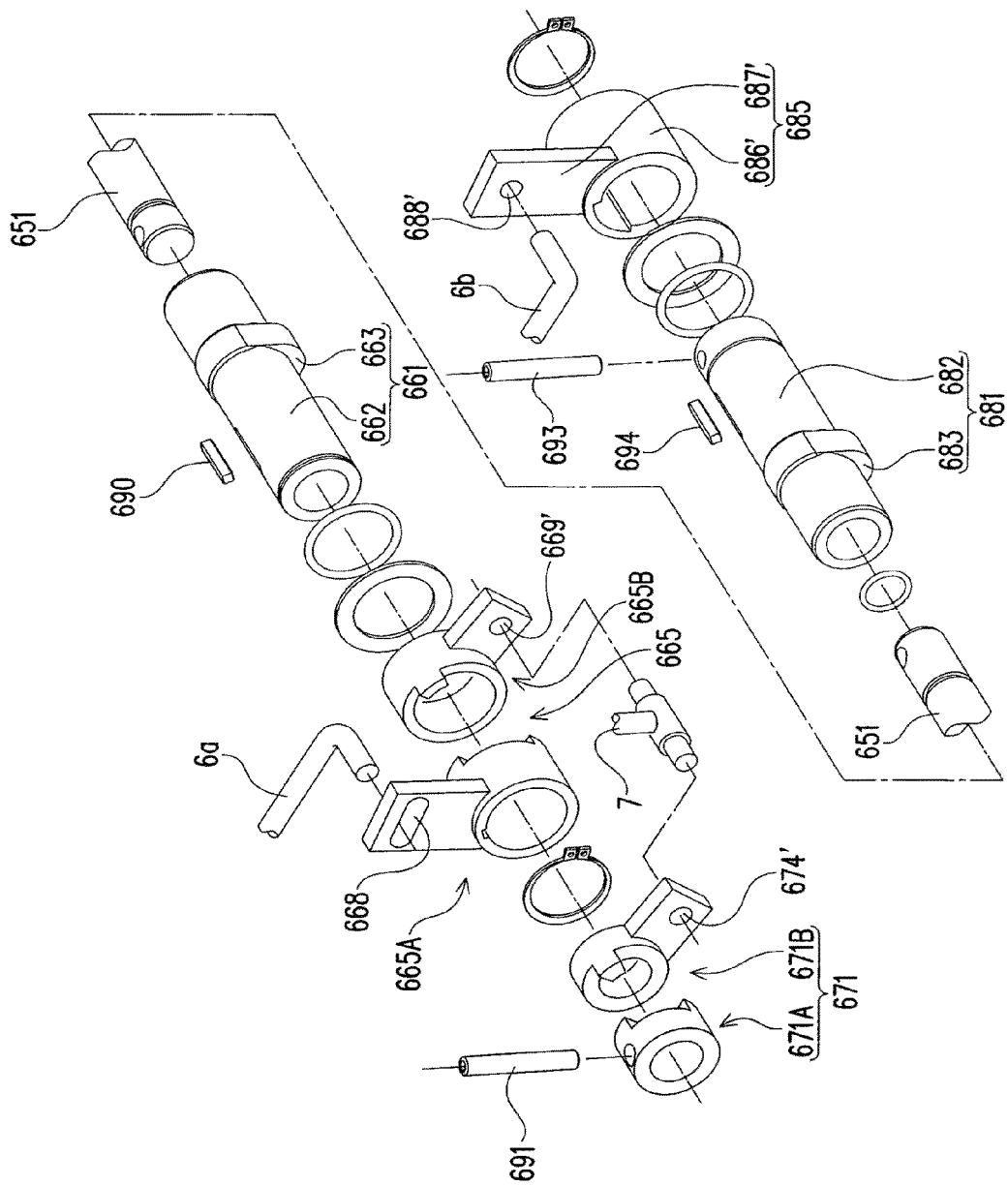
FIG. 24 is an exploded perspective view of a lost-motion enabling connection structure according to another embodiment.

FIG. 24 is an exploded perspective view of the lost-motion enabling connection structure according to another embodiment, in which the corresponding or identical parts or members to those illustrated in FIG. 17 are respectively allocated the same reference codes to omit the detailed description thereof.

In the embodiment of FIG. 24, the first brake connection member 665 is made up of two separate members, that is, a first member 665A and a second member 665B. The first member 665A is relatively non-rotatably mounted on the first operation member 661 and has the first brake groove 668, into which the first link mechanism 6a is engaged. The second member 665B is relatively rotatably mounted on the first operation member 661 while being relatively rotatable within a predetermined angle range with respect to the first member 665A and has a common brake hole 669', into which the common link mechanism 7 is engaged.

The common brake connection member 671 is also made up of two separate members, that is, a first member 671A and a second member 671B. The first member 671A is relatively non-rotatably mounted on the brake operation shaft 651. The second member 671B is relatively rotatably mounted on the brake operation shaft 651 while being relatively rotatable within a predetermined angle range with respect to the first member 671A and has a common brake hole 674', into which the common link mechanism 7 is engaged.

Further, the second brake connection member 685 has a tubular body 686' mounted on the second operation member 681 in such a manner as to be relatively rotatable within a predetermined angle range, and a connection portion 687' that is radially outwardly extending from the tubular body 686' and has a second brake hole 688', into which the second link mechanism 6b is engaged. In the embodiment of FIG. 24, the same effect as that of the aforesaid embodiment can also be produced.

Preferably, as illustrated in FIG. 14, the first fixed-side brake disk 612a and a second fixed-side brake disk 612b each are provided with a disk part 620 having a center hole 621 located at the radial center, and an extension part 625 radially outwardly extending from the disk part 620. The center hole 621 is sized to allow a corresponding one of the first and differential yoke shafts 51a, 51b to pass therethrough in a relatively rotatable manner. The extension part 625 has a cutout or opening 626, into which a corresponding one of the first and second actuation members 661, 681 (see FIG. 16) is engaged. With this arrangement, it is possible to make the first and second fixed-side brake disks 612a, 612b axially movable relative to the corresponding first and second differential yoke shafts 51a, 51b, while securely making the first and second fixed-side brake disks 612a, 612b non-rotatable.

More preferably, as illustrated in FIG. 14, the stop members 615a, 615b in the first and second brake units 610a, 610b each have a center hole 630 for bearing-support of a corresponding one of the first and second differential yoke shafts 51a, 51b, and a hole or cutout 635 for bearing-support of a corresponding one of the first and second actuation members 661, 681, in which the stop members 615a, 615b are fixedly connected to the transmission case 130 or a corresponding one of the brake covers 613a, 613b. With this arrangement, the first and second actuation members 661, 681 each are straddle-mounted by both a corresponding one of the brake covers 613a, 613b and a corresponding one of the stop members 615a, 615b. Accordingly, it is possible to securely support the first and second actuation members 661, 681 along with the brake operation shaft 651 on which these operational members are mounted.

In this embodiment, as the brake units 610, the friction plate type brake units are employed so that the first and second brake actuators 614a, 614b each are shifted along the axis of a corresponding one of the first and second differential yoke shafts 51a, 51b, according to the rotational motions of their own. The present invention is not necessarily limited to this arrangement. That is, the brake mechanism of the present invention is capable of being provided with brake units having a different structure such as drum brake units, in place of the frictional plate type brake units. For example, where the drum brake units are employed as the brake units, the brake actuators operatively connected to the aforesaid operation members are designed to apply brake power to corresponding brake drums according to the rotational motions of their own.

In this embodiment, the running-power transmission mechanism is further provided with a sub-axle power take-off unit 250 for outputting drive power to the sub axle 240 (the front axle in this embodiment).

As illustrated in FIG. 9, the sub-axle power take-off unit 250 includes a drive-side member 255 that is relatively non-rotatably mounted on the front end of the sub-speed change shaft 403 and has a spline on the outer circumference, a sub-axle drive shaft 260 (see FIG. 2) supported by the intermediate housing 120 so as to be coaxially aligned with the sub-speed change shaft 403, a driven-side member 265 that is relatively non-rotatably supported on the sub-axle drive shaft 260 so as to be located opposite to the drive-side member 255 and has a spline on the outer circumference, a sleeve 270 that is mounted on the drive-side member 255 and the driven-side member 265 and capable of taking an engaging position enabling connection between both the members 255, 265 in a relatively non-rotatable manner and a shutdown position enabling shutdown of power transmission from the drive-side member 255 to the driven-side member 265, and an operation mechanism 280 for operation of the sleeve 270.

As illustrated in FIG. 13, the operation mechanism 280 includes a sub-axle operation shaft 281 relatively rotatably supported by the intermediate housing 120 so as to extend in the vehicle width direction, and a fork member 282 that has a proximal end relatively non-rotatably supported on the sub-axle operation shaft 281 and a distal end arranged to be engaged with the sleeve 270.

The sub-axle operation shaft 281 is located to have at least one end protruding outward to have an outer extension, through which the sub-axle operation shaft 281 is rotated around the axis on the basis of the operation from the outside. In this embodiment, as illustrated in FIGS. 1 and 13, a proximal end of a sub-axle drive crank arm 285 is relatively non-rotatably connected to the outer extension of the sub-axle operation shaft 281. The sub-axle drive crank arm 285 has a free end connected to a free end of a hydraulic piston 291, a proximal end of the hydraulic piston 291 being placed in a hydraulic cylinder 290 for switching of the sub-axle drive.

With the above arrangement, the reciprocal motion of the hydraulic piston 291 relative to the hydraulic cylinder 290 causes the rotation of the sub-axle operation shaft 281 around the axis, and hence enables the sleeve 270 to be positioned at an engaging position or release position.

Figure 18:
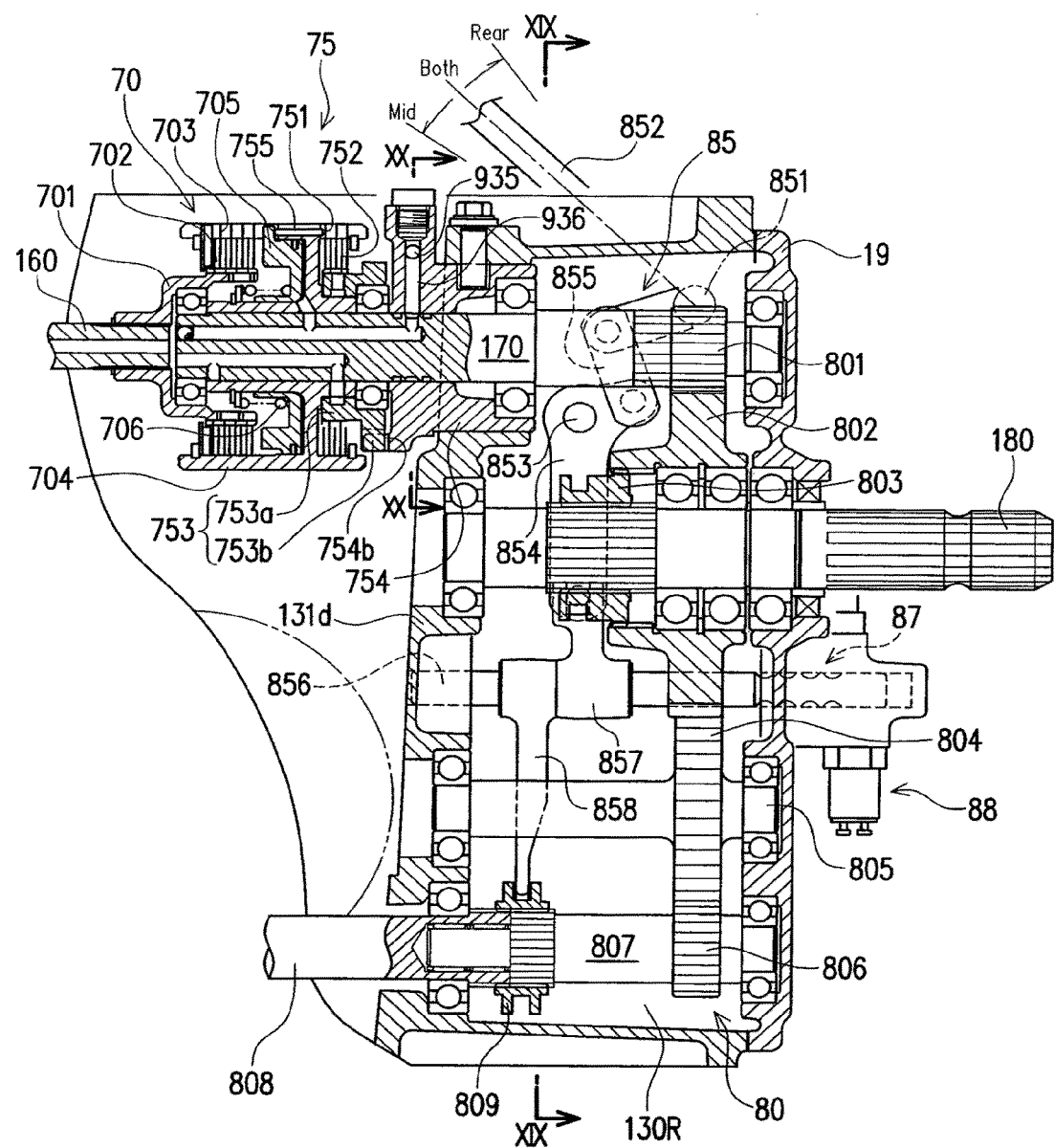
FIG. 18 is a side view of a rear chamber of the transmission case in longitudinal cross section.
Figure 19:
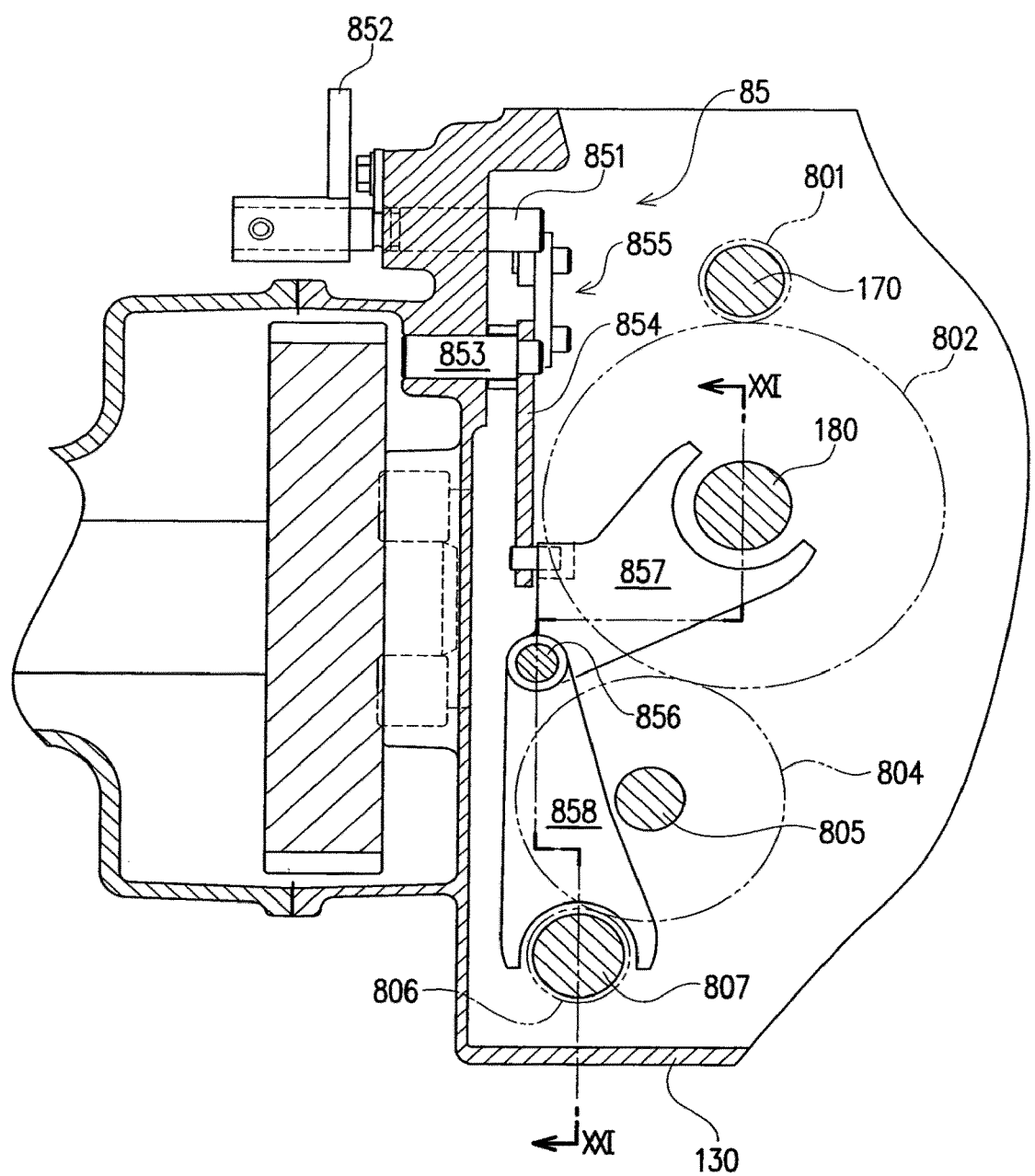
FIG. 19 is a cross sectional view taken along a line XIX-XIX in FIG. 18.
Figure 20:
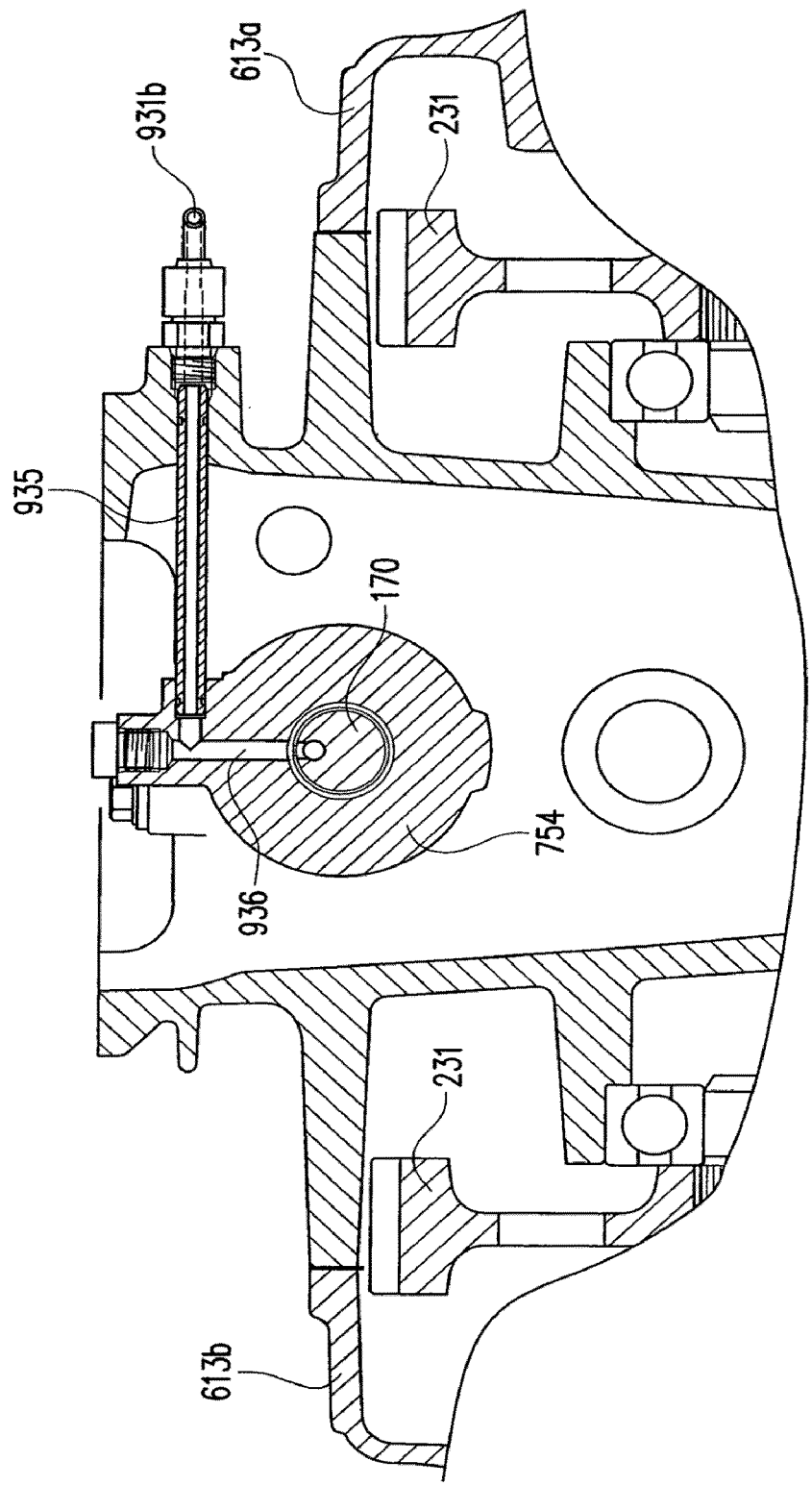
FIG. 20 is a cross sectional view taken along a line XX-XX in FIG. 18.

Now, the description will be made for the PTO transmission mechanism. FIG. 18 is a side view of the rear chamber 130R of the transmission case in longitudinal cross section. FIGS. 19 and 20 are cross sectional views respectively taken along a line XIX-XIX and a line XX-XX in FIG. 18.

As illustrated such as in FIGS. 2, 3, 7, 9, 15 and 18, the PTO transmission mechanism includes the drive shaft 200 operatively connected to the engine 10 via the flywheel 15, the main shaft 150 connected to a downstream end of the drive shaft 200 in the power transmission direction in such a manner as to be relatively non-rotatable around the axis, a PTO drive shaft 160 connected to a downstream end of the main shaft 150 in the power transmission direction in such a manner as to be relatively non-rotatable around the axis, a PTO driven shaft 170 located downstream of the PTO drive shaft 160 in the power transmission direction, a main-PTO clutch unit 70 for selectively performing power-transmission/power-shutoff from the PTO drive shaft 160 to the PTO driven shaft 170, a rear PTO shaft 180 relatively rotatably supported by the second intermediate wall 131d and the rear plate 19 so as to have a first end outwardly extending, a mid PTO shaft 190 supported to have a first end outwardly extending, and a PTO switch unit 80 for selectively performing power-transmission/power-shutoff from the PTO driven shaft 170 to the rear PTO shaft 180 and/or the mid PTO shaft 190.

The main shaft 150 extends into the intermediate housing 120 along the vehicle longitudinal axis, as illustrated in FIG. 2. Preferably, the bearing wall 123 of the intermediate housing 120 has a bearing hole for bearing-support of the main shaft 150, which enables secure support of the main shaft 150.

The PTO drive shaft 160 is rotatably supported by the center plate 18 and the first intermediate wall 131c, as illustrated in FIGS. 2 and 9. The PTO driven shaft 170 is rotatably supported by the second intermediate wall 131d and the rear plate 19 so as to be coaxially aligned with the PTO drive shaft 160, as illustrated in FIG. 18.

As best illustrated in FIG. 18, the PTO clutch unit 70 includes a drive-side member 701 relatively non-rotatably supported on the PTO drive shaft 160, a drive-side friction plate 702 relatively non-rotatably and axially movably supported on the drive-side member 701, a driven-side friction plate 703 located opposite to the drive-side friction plate 702, a clutch housing 704 that is relatively non-rotatably supported on the PTO driven shaft 170 and supports the driven-side friction plate 703 in a relatively non-rotatable and axially movable manner, a clutch piston 705 for bringing the drive-side friction plate 702 and the driven-side friction plate 703 into frictional engagement with each other by the hydraulic effect, and a spring 706 for urging the clutch piston 705 away from the drive-side friction plate 702 and the driven-side friction plate 703.

In this embodiment, the PTO transmission mechanism further includes a PTO brake unit 75 operable in association with the PTO clutch unit 70. The PTO brake unit 75 includes a first friction plate 751 relatively non-rotatably and axially movably supported by the clutch housing 704, a second friction plate 752 located opposite to the first friction plate 751, a ring member 754 for relatively non-rotatably and axially movably supporting the second friction plate 752, a fixed member 754 for stopping the rotation of the ring member 753 by abutment against the ring member 753, and a pressing pin 755 connected to the clutch piston 705.

The ring member 753 has a body portion 753a relatively non-rotatably supported by the clutch housing 704 and a radially extending portion 753b radially outwardly extending from a certain region of the peripheral surface of the body portion 753a. The ring member 753 stops its rotation by abutment against an abutting portion 754b provided on the fixed member 754 (see FIG. 14).

According to the thus arranged PTO brake unit 75, the clutch piston 705 is pressed and moved by the spring 706 by shutoff of the supply of pressurized fluid to the PTO clutch unit 70. Whereby, the pressing pin 755 brings the first friction plate 751 and the second friction plate 752 into frictional engagement with each other so that the PTO driven shaft 170 and the ring member 753 are rotated integrally with each other. As described above, the ring member 753 has the radially extending portion 753b radially outwardly extending from a certain region of the peripheral surface of the body portion 753a. Accordingly, this radially extending portion 753b abuts against the abutting portion 754b of the fixed member 754 by the rotation of the ring member 753 by a certain angle, thereby stopping rotation of the ring member 753 and hence applying brake power to the PTO driven shaft 170.

As best illustrated in FIG. 18, in this embodiment, the PTO switch unit 80 includes a first transmission gear member 801 mounted on a portion of the PTO driven shaft 170 located within the rear chamber 130R, a second gear member 802 relatively rotatably supported on the rear PTO shaft 180 in meshed engagement with the first transmission gear member 801, a rear PTO sleeve 803 that is axially movable and relatively non-rotatable to the rear PTO shaft 180 and is capable of taking an engaging position enabling meshed engagement with internal threads formed on the second gear member 802 and a release position releasing itself from meshed engagement with the internal threads, a third gear member 804 held in meshed engagement with the second gear member 802, a first intermediate shaft 805 that relatively non-rotatably supports the third gear member 804, a fourth gear member 806 held in meshed engagement with the third gear member 804, a second intermediate shaft 807 that is rotatably supported by the second intermediate wall 131d and the rear plate 19 and relatively non-rotatably supports the fourth gear member 806, a mid PTO transmission shaft 808 located coaxial with the second intermediate shaft 807, a mid PTO sleeve 809 that is axially movably supported by the mid PTO transmission shaft 808 and the second intermediate shaft 807 and is capable of taking an engaging position enabling connection of both the shafts 808, 807 together in a relatively axially non-rotatable manner and a release position enabling both the shafts 808, 807 to be relatively axially movable to each other, a mid PTO case 820 (see FIG. 10) that is separably connected to the transmission case 130 and supports the mid PTO shaft 190, and a gear train 825 that connects the mid PTO transmission shaft 808 and the mid PTO shaft 190 together and is supported by the mid PTO case 820.

As illustrated in FIG. 1, the vehicle of this embodiment is equipped with a mower device 9 under the frame structure 100 to be operatively driven by the mid PTO shaft 190.

Figure 21:
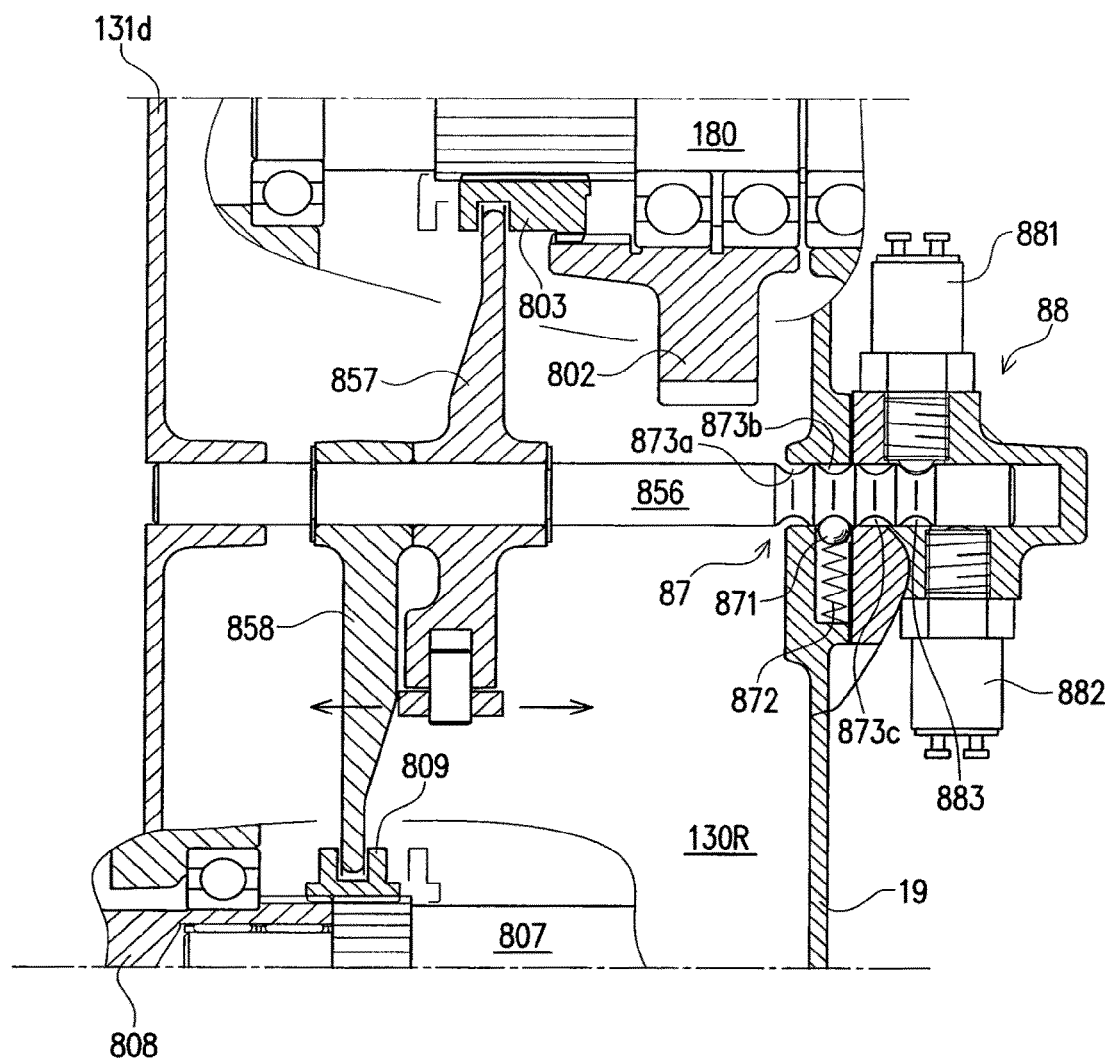
FIG. 21 is a cross sectional view taken along a line XXI-XXI in FIG. 19.

The PTO transmission mechanism further includes a PTO operation unit 85 that operates the mid PTO sleeve 809 and the rear PTO sleeve 803. FIG. 21 is a cross sectional view taken along a line XXI-XXI in FIG. 19.

As illustrated in FIGS. 18, 19 and 21, the PTO operation unit 85 includes a PTO operation shaft 851 that is rotatably supported by the transmission case 130 so as to have first and second ends respectively positioned outside and inside of the transmission case 130, a PTO switch lever 852 relatively non-rotatably connected to an outer end of the PTO operation shaft 851, a PTO operation arm 854 pivotally movable around a pivot shaft 853 orthogonal to the rear PTO shaft 180, an intermediate link 855 that links an inner end of the PTO operation shaft 851 to the PTO operation arm 854 to be operated in association with each other and pivotally moves the PTO operation arm 854 around the pivot axis 853 according to the rotation of the PTO operation shaft 851 around the axis, a PTO fork shaft 856 that is axially movably supported by the second intermediate wall 131d and the rear plate 19 so as to be aligned parallel to the rear PTO shaft 180, a rear PTO fork 857 that is axially immovably supported on the PTO fork shaft 856 and has a proximal end engaged with a free end of the PTO operation arm 854 and a free end engaged with the PTO sleeve 803, and a mid PTO fork 858 that is axially immovably supported on the PTO fork shaft 856 and has a free end engaged with the mid PTO sleeve 809.

The thus arranged PTO operation unit 85 is operated in the following manner. Upon direct or indirect operation of the PTO switch lever 852, the PTO operation shaft 851 is axially rotated, which rotation causes the PTO operation arm 854 to be pivotally moved around the pivot shaft 853 so that the rear PTO fork 857 and the mid PTO fork 858 are moved in the axial direction of the rear PTO shaft 180 along with the PTO fork shaft 856. With these axial motions of the rear PTO fork 857 and the mid PTO fork 858, the PTO sleeve 803 and the mid PTO sleeve 809 are pressed in association therewith. That is, the PTO operation unit 85 is capable of moving both the rear PTO sleeve 803 and the mid PTO sleeve 809 by operating only the PTO switch lever 852.

More specifically, the PTO fork shaft 856 is capable of taking a rear-PTO shaft output position enabling only the rear PTO sleeve to be positioned at an engaging position, both-PTO shaft output position enabling both the rear PTO sleeve and the mid PTO sleeve to be positioned at their engaging positions and a mid-PTO shaft output position enabling only the mid PTO sleeve to be positioned at an engaging position.

That is, upon selectively positioning the PTO switch lever 852 at (1) "Rear" output position, (2) "Both" output position and (3) "Mid" output position (see FIG. 18), the PTO fork shaft 856, the rear PTO fork 857, mid PTO fork 858, the rear PTO sleeve 803 and the mid PTO sleeve 809 are respectively capable of taking (1) a position enabling only the PTO sleeve 803 to be positioned at the engaging position, (2) a position enabling both the rear PTO sleeve 803 and the mid PTO sleeve 809 to be simultaneously positioned at their engaging positions, and (3) a position enabling only the mid PTO sleeve 809 to be positioned at the engaging position.

Preferably, as illustrated in FIG. 21, the PTO fork shaft 856 is provided with a PTO detent mechanism 87 for preventing unintentional axial motion of the PTO fork shaft 856. The PTO detent mechanism 87 includes a ball 871 that can move forward and rearward in the radial direction of a bearing hole for the PTO fork shaft 856, a spring 872 that urges the ball 871 towards the radially inner side of the bearing hole, a recessed portion 873a for the rear-PTO output position, a recessed portion 873b for the both-PTO shaft output position and a recessed portion 873c for the mid-PTO shaft output position, all of the recessed portions 873a, 873b, 873c being formed on the outer circumference of the PTO fork shaft 856 along the axis, into which the ball 871 is selectively engaged.

More preferably, the PTO switch unit 80 is provided with a PTO output detection mechanism 88 for detecting the output status of each of the rear PTO shaft 180 and the mid PTO shaft 190. The PTO output detection mechanism 88 has first and second switches 881, 882 to be turned on and off according to the a axial position of the PTO fork shaft 856.

In this embodiment, the first and second switches 881, 882 are turned off when in engagement with the recessed portions of the PTO fork shaft, and turned on when in engagement with the outer circumference of the PTO fork shaft other than the recessed portions.

Specifically, as illustrated in FIG. 21, the PTO fork shaft 856 has a recessed sensing-portion 883 in addition to the recessed portions 873a, 873b and 873c. The first and second switches 881, 882 are located so that (1) when the PTO fork shaft 856 lies at the rear-PTO shaft output position, the first and second switches 881, 882 are respectively engaged with the recessed portion 873c for the mid-PTO shaft output position and the recessed sensing-portion 883, (2) when the PTO fork shaft 856 lies at the both-PTO shaft output position, the first and second switches 881, 882 are respectively engaged with the recessed sensing portion 883 and the outer circumference, and (3) when the PTO fork shaft 856 lies at the mid-PTO shaft output position, the first and second switches 881, 882 are not engaged with any recessed portions.

Table 1 shows the relationship between the ON/OFF status of the first and second switches 881, 882 and the output status of both the PTO shafts.

TABLE 1

| SHAFT KEPT IN ROTATION | FIRST SWITCH 881 | SECOND SWITCH 882 |
|---|---|---|
| REAR PTO SHAFT 180 | ON | ON |
| REAR/MID PTO SHAFTS 180, 190 | OFF | ON |
| MID PTO SHAFT 190 | OFF | OFF |

As shown in Table 1, it is possible to securely detect in real time which PTO shaft 180, 190 has been rotating, on the basis of the ON/OFF status of the first and second switches 881, 882. FIG. 21 illustrates a simultaneous output status in which both the PTO shafts 180, 190 have been rotating.

Figure 22:
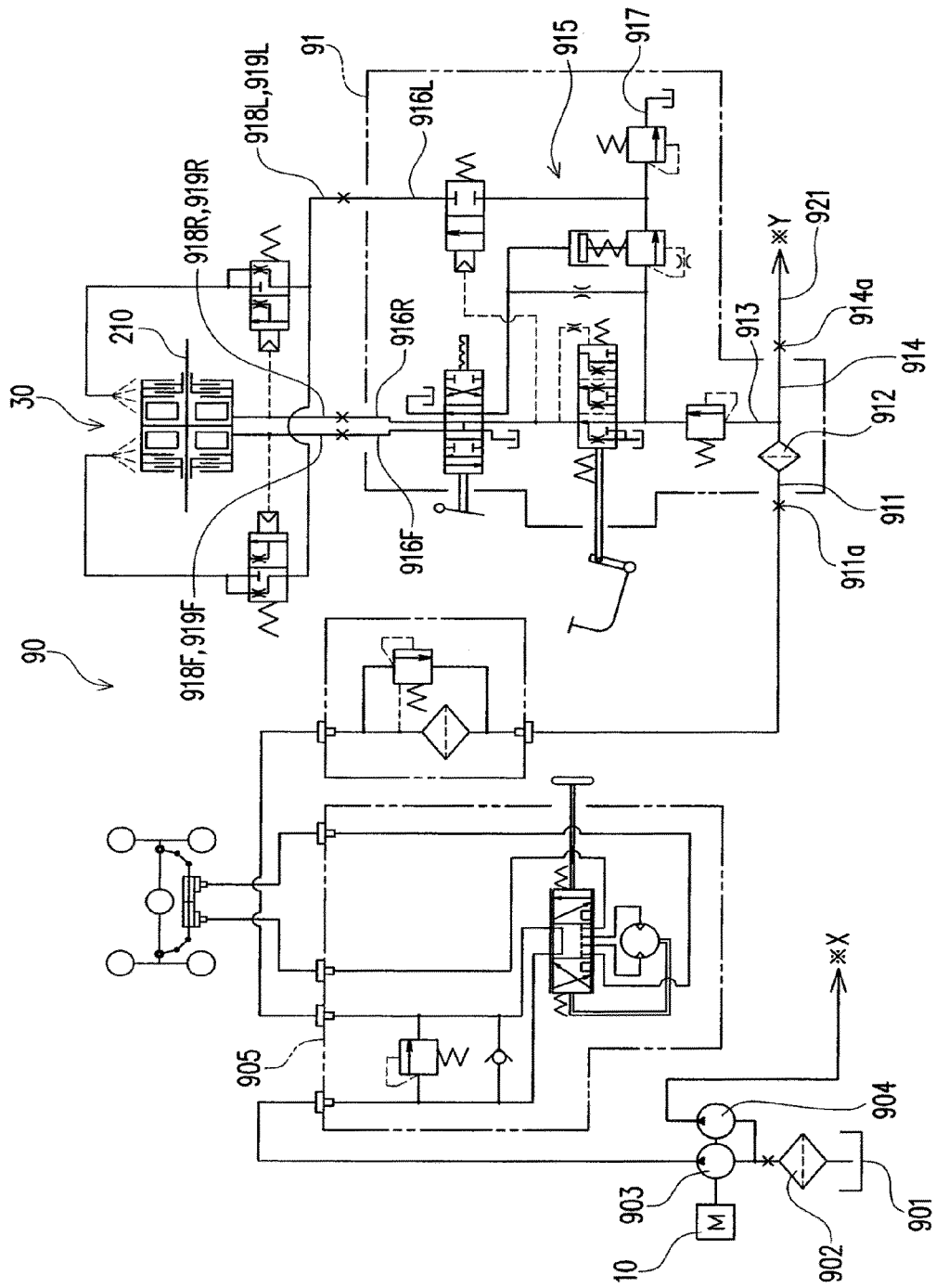
FIG. 22 is a hydraulic circuit diagram in part of the vehicle of FIG. 1.
Figure 23:
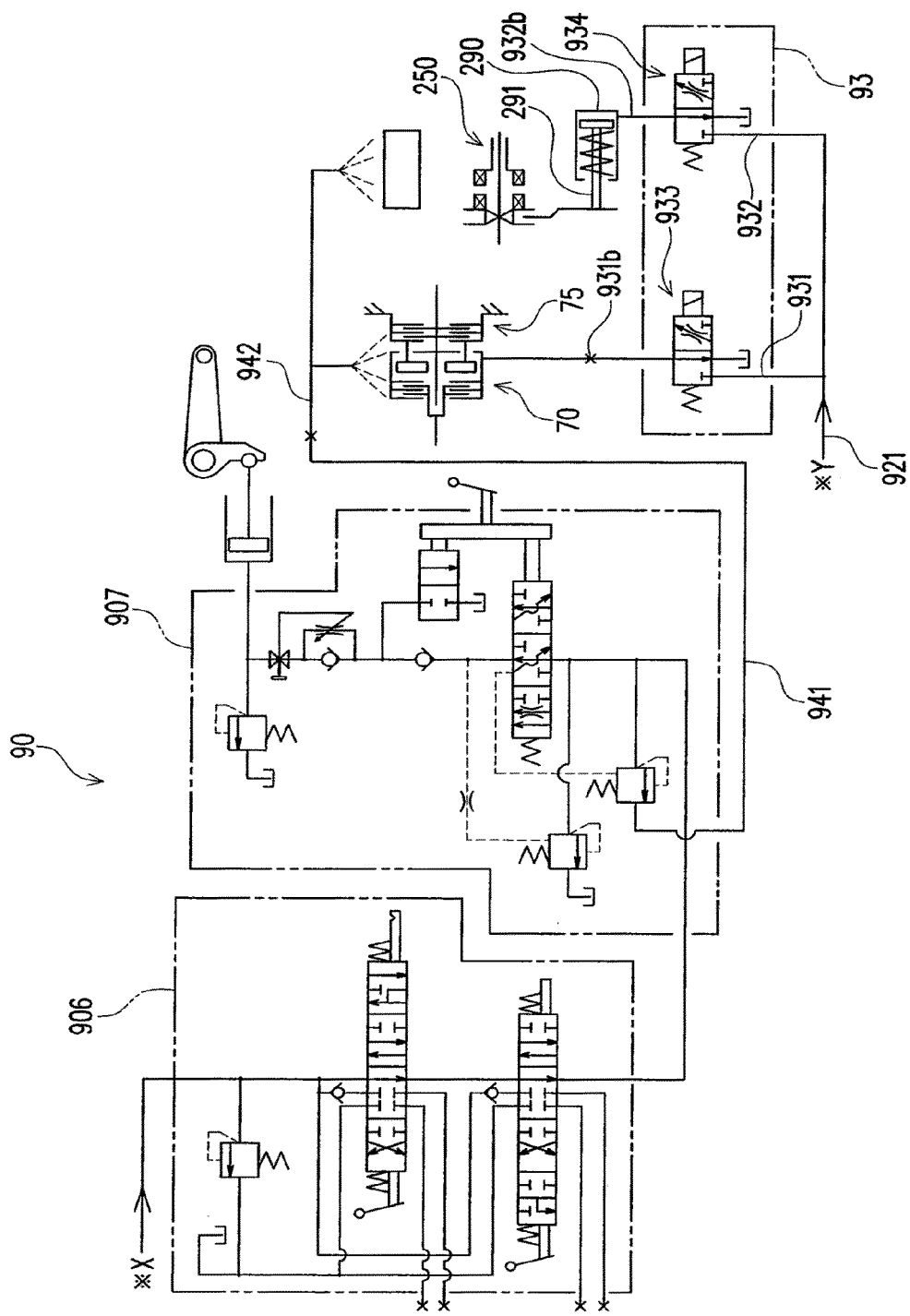
FIG. 23 is a hydraulic circuit diagram in part of the vehicle of FIG. 1.

Now, the description will be made for a hydraulic mechanism 90 of the vehicle in this embodiment. FIGS. 22 and 23 respectively illustrate hydraulic circuit diagrams of the vehicle. As illustrated in FIG. 22, the hydraulic mechanism 90 includes a tank 901 for storing hydraulic fluid, and first and second hydraulic pumps 903, 904 for respectively sucking stored hydraulic fluid from the tank 901 through a filter 902.

In this embodiment, at least a portion of the inner space of the frame structure 100 is used as the tank 901. That is, the flywheel housing 110, the intermediate housing 120 and the transmission case 130 form accommodating spaces for various transmission mechanisms, as well as constituting a portion of the chassis, in which at least a portion of the inner space forms a hydraulic fluid reservoir space.

Now, the description will be made in detail for the hydraulic fluid reservoir space of the frame structure 100. As described above, the frame structure 100 is designed so that the inner spaces of the intermediate housing 120 and the reverser housing 310 are utilized as a fluid chamber, and the flywheel accommodating space (a space other than the space occupied by the reverser housing) of the flywheel housing 110 is utilized as a dry chamber.

In addition to the above arrangement, as illustrated in FIG. 8, the center plate 18, which is interposed between the intermediate housing 120 and the transmission case 130, has fluid communication ports 18a on its lower side. The rear opening of the transmission case 130 is sealed by the rear plate 19 in a liquid tight manner, as described above. With this arrangement, the frame structure 100 of this embodiment makes it possible to utilize the inner spaces of the intermediate housing 120 and the transmission case 130 as the fluid reservoir space.

Further, the frame structure 100 is designed to make it possible to get hydraulic fluid out of the fluid reservoir space via the filter 902. Specifically, the frame structure 100 has a filter accommodating portion 100a for accommodating the filter 902, and a partition wall 101 for separating the filter accommodating portion 100a from a main portion 100b other than the filter accommodating portion 100a.

In this embodiment, as illustrated in FIG. 10, the partition wall 101 is provided on the transmission case 130. Specifically, the transmission case 130 has a bulge 135 that extends in the vehicle width direction over a region of the transmission case 130 from the front end, which end facing the rear end of the intermediate housing 120 through the center plate 18, rearward to a portion with a predetermined distance. The bulge 135 forms the filter accommodating portion 100a.

In the transmission case 130, the partition wall 101 extends from the inner surface of one of the pair of lateral walls 131b, on which the bulge 135 is formed, towards the lateral center of the transmission case 130. The inner space of the bulge 135 is divided from the other portion by the partition wall 101.

More specifically, the partition wall 101 has a communication port 102 for communication between the filter accommodating portion 100a and the main portion 100b in a lower region of the fluid reservoir space. That is, the partition wall 101 divides the filter accommodating portion 100a from the main portion 100b in such a manner as to allow fluid communication only in the lower region.

The frame structure of this embodiment is capable of securely getting hydraulic fluid out of the fluid reservoir space without fluid running-out, while keeping the amount of hydraulic fluid stored therein as low as possible.

That is, the fluid stored in the fluid reservoir space causes a drag resistance in various transmission mechanisms placed inside of the frame structure 100. Accordingly, it is preferable to reduce the amount of fluid stored in the fluid reservoir space in light of the power transmission efficiency. On the other hand, excessive reduction of hydraulic fluid in the fluid reservoir space may cause fluid running-out during the fluid is drawn out. Particularly, when the vehicle tilts due to such as running up or down a slope, the surface level of store fluid is changed. As a result, air may be drawn into a hydraulic circuit.

The frame structure 100 of this embodiment is designed so that the partition wall 101 allows the filter accommodating portion 100a to be communicated with the main portion only in the lower region of the fluid reservoir space. With this arrangement, it is possible to keep variation in the surface level of hydraulic fluid in the filter accommodating portion 100a, which is caused by variation in vehicle's posture or the like, as low as possible. Accordingly, the amount of hydraulic fluid in the fluid reservoir space can be limited, thereby preventing deterioration in power transmission efficiency, while effectively preventing running-out of hydraulic fluid sucked through the filter 902.

Preferably, the partition wall 101 is located to have the communication port 102 positioned substantially at the vehicle lateral center. With this arrangement, it is possible to limit variation in surface level of hydraulic fluid in the filter accommodating portion 100a when the vehicle has tilted rightward or leftward. In this embodiment, as illustrated in FIG. 10, the partition wall 101 has a horizontal portion 101a extending substantially horizontally from the lateral wall 131b of the transmission case 130 substantially to the lateral center of the frame structure 100, and a vertical portion 101b extending from a free end of the horizontal portion 101a substantially downward, in which the communication port 102 defined by a free end of the vertical portion 101b and an inner surface of the bottom wall 131a of the transmission case 130 is positioned substantially at the vehicle lateral center.

More preferably, the partition wall 101 is located to have the communication port 102 positioned substantially at the center of the fluid reservoir space with respect to the vehicle longitudinal direction. With this arrangement, it is possible to effectively limit variation in surface level of hydraulic fluid within the filter accommodating portion 101a when the vehicle has tilted forward or rearward. In this embodiment, as described above, the inner spaces of the intermediate housing 120 and the transmission case 130 together form a fluid reservoir space. Therefore, the partition wall 101 is formed near the front end of the transmission case 130.

More preferably, as illustrated in FIGS. 9 and 10, an oil heater 105 is provided near the communication port 102 so as to effectively prevent deterioration in viscosity of hydraulic fluid during cold season. That is, hydraulic fluid sucked through the filter 902 is drawn into the filter accommodating portion 100a through the communication port 102. Thus, the oil heater 105 provided near the communication hole 102 can efficiently heat hydraulic fluid when it is drawn out of the fluid reservoir space for use.

In this embodiment, as illustrated in FIGS. 7 to 9, the downward bulge 122 is formed near the rear end of the intermediate housing 120 and the oil heater 105 is introduced through the front side of the downward bulge 122 and detachably installed in place. A reference code 18b in FIG. 9 represents a passing hole formed in the center plate 18, through which the oil heater passes.

In this embodiment, the frame structure 100 is made up of three units, namely the flywheel housing 110, the intermediate housing 120 and the transmission case 130. In this regard, it is to be noted that the effect produced by providing the partition wall 101 is not limited to the arrangement of this embodiment. That is, it is possible to apply the partition wall 101 to a frame structure made up of a single unit, two units or the like, as far as such unit(s) are arranged from one side to another side along the vehicle longitudinal axis and can utilize at least a portion of the inner space defined by the unit(s) as a hydraulic fluid reservoir space.

The hydraulic mechanism 90 further includes a power reverser valve 91, to which hydraulic fluid sucked from the fluid reservoir space through the filter 902 by the first hydraulic pump 903 is supplied. In this embodiment, a power-steering hydraulic circuit 905 is interposed between the first hydraulic pump 903 and the power reverser valve 91 so as to utilize pressurized fluid from the first hydraulic pump as power steering hydraulic fluid.

In this embodiment, the power reverser valve 91 is connected to a side wall of the intermediate housing 120, as illustrated in FIGS. 4 and 7. The power reverser valve 91 includes an input line 911 for receiving pressurized hydraulic fluid from the first hydraulic pump 903 via an input port 911a, a line filter 912 placed in the input line 911, first and second output lines 913, 914 branched off from the input line 911 on the downstream side of the line filter 912, a valve group 915 placed in the first output line 913, a forward-travel line 916F, a rearward-travel line 916R and a lubricant line 916L provided on the downstream side of the valve group 915, and a drain line 917 for discharging drain fluid from the valve group 915 into the fluid reservoir space.

As illustrated in FIGS. 4 and 7, the forward-travel line 916F, the rearward-travel line 916R and the lubricant line 916L are respectively communicated with a rotary joint 92 formed on a front side of the reverser housing 310 via conduits arranged in the intermediate housing 120 and the flywheel housing 110 or fluid passages 918, 919 bored in the intermediate housing 120, and communicated with respective fluid passages bored in the drive shaft 200 via the rotary joint 92. In FIGS. 4, 6, 7 and 22, "F", "R" and "L" are respectively suffixed to the reference codes "918", "919" of the conduits or the fluid passages corresponding respectively to the forward-travel line 916F, the rearward-travel line 916R and the lubricant line 916L.

In this embodiment, of the end wall 311a of the reverser housing 310, a surface portion facing the support surface 125b has fluid grooves 920 for communication between a conduit or the fluid passage 918 formed in the intermediate housing 120 and a conduit or the fluid passage 919 formed in the flywheel housing 110 (see FIG. 5). In FIG. 5, likewise, "F", "R" and "L" are respectively suffixed to the reference code "920" of the fluid grooves corresponding respectively to the forward-travel line 916F, the rearward-travel line 916R and the lubricant line 916L.

The second output line 914 is communicated with a PTO valve 93 via a conduit 921 connected with an output port 914a (see FIGS. 4, 22 and 23). The PTO valve 93 includes a PTO clutch line 931 and a sub-axle drive switch line 932, and solenoid switch valves 933, 934 respectively placed in these lines 931, 932.

As illustrated in FIGS. 18 and 20, a downstream-side port 932b of the PTO clutch line 931 is communicated with a PTO clutch fluid passage bored in the PTO driven shaft 170 via a proper conduit 935 and a fluid passage 936 bored in the fixed member 754. On the other hand, the downstream-side port 932b of the sub-axle drive switch line 932 is communicated with the hydraulic cylinder 290 for switching of the sub-axle drive (see FIG. 1) via a proper conduit.

The hydraulic mechanism 90 further includes a hydraulic supply valve 906 for a front loader, into which pressurized fluid from the second hydraulic pump 904 is supplied, and a hydraulic supply valve 907 for a hydraulic lift, in which the hydraulic supply valve 907 is located on the downstream side of the hydraulic supply valve 906 (see FIGS. 22 and 23).

The hydraulic mechanism 90 further includes a PTO lubricant line 941 that supplies relief fluid from the hydraulic supply valve 907 into the PTO clutch unit 70 and the PTO brake unit 75 as lubricant.

As illustrated in FIGS. 9 and 18, the PTO lubricant line 941 is communicated with lubricant passages respectively bored in the PTO drive shaft 160 and the main-speed change shaft 401 via a fluid passage 942 bored in the first intermediate wall 131c of the transmission case 130.

In this embodiment, two hydraulic pumps (the first and second hydraulic pumps 903, 904) are provided in order to address excessive load applied to a single hydraulic pump. That is, the number of hydraulic pumps are properly set according to the installed hydraulic circuits. It is a matter of course that various hydraulic circuits provided in this embodiment are properly subjected to omission, modification or addition according to the specification of a vehicle.

This specification is by no means intended to restrict the present invention to the preferred embodiments set forth therein. Various modifications to the frame structure, as well as the brake mechanism as described herein, may be made by those skilled in the art without departing from the spirit and scope of the present invention as defined in the appended claims.

What is claimed is:

1. A frame structure of a vehicle extending comprising:
    a flywheel housing, an intermediate housing and a transmission case that are arranged in this order from a front side to a rear side in a vehicle a longitudinal direction and are connected to each other so as to constitute a vehicle frame as providing an inner space, at least a portion of said inner space defining a hydraulic fluid reservoir space; wherein:
    a connection portion between said intermediate housing and said transmission case is arranged to enable fluid communication between inner spaces of said intermediate housing and said transmission case, a connection portion between said intermediate housing and said flywheel housing is arranged to provide a fluid tight seal between inner spaces of said intermediate housing and said flywheel housing, so that inner spaces of said flywheel housing, said intermediate housing and said transmission-case are divided into a space of a dry chamber for accommodating a flywheel and said hydraulic fluid reservoir space,
    said transmission case having a bulge that extends to a first side in a vehicle width direction as extending from an opening of a front end of the transmission case towards a rear end of the transmission case along the vehicle longitudinal direction so as to provide a space for a filter housing portion so that a filter can be installed in place by introducing the same from the front side of the vehicle longitudinal direction, and a partition wall that divides said hydraulic fluid reservoir space into the filter housing portion and a main portion other than said filter housing portion,
    said partition wall having a horizontal portion extending substantially horizontally from a lateral wall of the transmission case on a first side toward a second side opposite to the first side in the vehicle width direction until substantially a center of the frame structure in the vehicle width direction, and a vertical portion extending from a free end of the horizontal portion substantially downward, so that a space between a free end of the vertical portion and an inner surface of a bottom wall of the transmission case forms a communication port for communication between said filter housing portion and said main portion, and
    said transmission case includes a mid PTO transmission shaft that is arranged on the second side of the vertical portion in the vehicle width direction and extends along the vehicle longitudinal direction while a front end portion is overlapped with the vertical portion as viewed along the vehicle width direction, a mid PTO case that is connected to a lateral wall of the transmission case on the second side in the vehicle width direction, a mid PTO shaft supported by the mid PTO case so as to be along the vehicle longitudinal direction while a front end extends outwardly from the mid PTO case, and a gear train that has gears supported by the mid PTO transmission shaft and the mid PTO shaft, respectively, so as to transmit rotational power from the mid PTO transmission shaft to the mid PTO shaft.

2. A frame structure of a vehicle according to claim 1, wherein
    said intermediate housing includes a bottom wall that downwardly bulges at a rear end to form a downward bulge, and
    said frame structure being arranged so that an oil heater can be detachably installed through a front side of the downward bulge to be positioned in proximity of said communication hole.

* * * * *